US012239992B2

(12) United States Patent
Kumar et al.

(10) Patent No.: US 12,239,992 B2
(45) Date of Patent: Mar. 4, 2025

(54) TEMPERATURE-CONTROLLABLE REAGENT CARTRIDGE AND TEMPERATURE CONTROL SYSTEM FOR THE SAME

(71) Applicants: ILLUMINA, INC., San Diego, CA (US); ILLUMINA SINGAPORE PTE. LTD., Singapore (SG)

(72) Inventors: Ashish Kumar, San Diego, CA (US); Kevin Michael Festini, Poway, CA (US); Venkatesh Mysore Nagaraja Rao, Woodlands Crescent (SG); Erik Lewis Williamson, Carlsbad, CA (US)

(73) Assignees: Illumina, Inc., San Diego, CA (US); Illumina Singapore Pte. Ltd., Singapore (SG)

( * ) Notice: Subject to any disclaimer, the term of this patent is extended or adjusted under 35 U.S.C. 154(b) by 1357 days.

(21) Appl. No.: 16/694,877

(22) Filed: Nov. 25, 2019

(65) Prior Publication Data

US 2020/0171502 A1 Jun. 4, 2020

Related U.S. Application Data

(60) Provisional application No. 62/774,000, filed on Nov. 30, 2018.

(51) Int. Cl.
*B01L 7/00* (2006.01)
*B01L 3/00* (2006.01)

(52) U.S. Cl.
CPC ............... *B01L 7/525* (2013.01); *B01L 3/527* (2013.01); *B01L 2300/0858* (2013.01);
(Continued)

(58) Field of Classification Search
None
See application file for complete search history.

(56) References Cited

U.S. PATENT DOCUMENTS 4,338,279 A * 7/1982 Orimo .................. G01N 21/253 422/65
4,517,160 A * 5/1985 Galle ..................... G01N 35/02 422/65

(Continued)

FOREIGN PATENT DOCUMENTS

CN 103765224 A 4/2014
CN 105561904 5/2016

(Continued)

OTHER PUBLICATIONS

IN Office Action dated Jan. 19, 2023 in Application No. IN202017055821.

(Continued)

*Primary Examiner* — Matthew D Krcha
(74) *Attorney, Agent, or Firm* — Weaver Austin Villeneuve & Sampson LLP

(57) ABSTRACT

Temperature-controllable reagent cartridges and systems for controlling the temperature in such reagent cartridges are provided. An example such system may include a reagent cartridge having reagent reservoirs located at least in part within an interior plenum volume of a cartridge housing. In such an example system, each reagent reservoir may be defined, in part, by a sidewall, and a first reagent reservoir may be spaced apart from a second reagent reservoir to form a fluid flow passage between corresponding sidewalls thereof. A fluid inlet through the cartridge housing may be provided that fluidically connects the interior plenum volume with a fluid supply port of a temperature control system of an analysis instrument when the reagent cartridge is received by the analysis instrument; a fluid outlet through the cartridge housing that fluidically connects the interior plenum volume with a fluid return port of the temperature control system may also be provided.

18 Claims, 18 Drawing Sheets

(52) U.S. Cl.
CPC .................. *B01L 2300/0861* (2013.01); *B01L 2300/1811* (2013.01); *B01L 2400/0475* (2013.01)

(56) References Cited

U.S. PATENT DOCUMENTS

| | | | | |
|---|---|---|---|---|
| 5,508,197 | A | 4/1996 | Hansen et al. | |
| 6,113,767 | A | 9/2000 | Flesher et al. | |
| 6,783,736 | B1 | 8/2004 | Taylor et al. | |
| 7,604,938 | B2 | 10/2009 | Takahashi et al. | |
| 7,745,207 | B2 | 6/2010 | Jovanovich et al. | |
| 8,105,783 | B2 | 1/2012 | Handique | |
| 2006/0105433 | A1 * | 5/2006 | Bickmore, Jr. | B01L 7/52 165/206 |
| 2006/0148063 | A1 * | 7/2006 | Fauzzi | G01N 1/31 422/65 |
| 2007/0248958 | A1 | 10/2007 | Jovanovich et al. | |
| 2008/0032347 | A1 | 2/2008 | Sarofim et al. | |
| 2008/0092553 | A1 | 4/2008 | Hochgraeber et al. | |
| 2011/0071055 | A1 | 3/2011 | Belgrader et al. | |
| 2017/0211854 | A1 * | 7/2017 | Crocco | B01L 7/52 |
| 2018/0117587 | A1 * | 5/2018 | Lemoine | B01L 3/502715 |

FOREIGN PATENT DOCUMENTS

| | | | | |
|---|---|---|---|---|
| CN | 107118961 | | 9/2017 | |
| CN | 108351340 | A | 7/2018 | |
| CN | 211698733 | | 10/2020 | |
| DE | 202011000592 | | 10/2011 | |
| EP | 1266691 | A1 * | 12/2002 | B01L 3/50851 |
| EP | 3308860 | A1 | 4/2018 | |
| JP | H0618531 | A | 1/1994 | |
| JP | 2004500891 | A | 1/2004 | |
| JP | 2008508532 | A | 3/2008 | |
| JP | 2013185980 | A | 9/2013 | |
| JP | 2013545435 | A | 12/2013 | |
| JP | 2020500287 | A | 1/2020 | |
| KR | 20190071632 | A | 6/2019 | |
| RU | 2435163 | C2 | 11/2011 | |
| TW | 201643430 | | 12/2016 | |
| TW | I624294 | | 5/2018 | |
| WO | WO-2009010970 | A2 * | 1/2009 | B01J 19/004 |
| WO | WO-2018003009 | A1 | 1/2018 | |
| WO | WO-2018071467 | A1 | 4/2018 | |

OTHER PUBLICATIONS

International Preliminary Report on Patentability dated Jun. 10, 2021 in Application PCT/US2019/063079.
RU Office Action dated Mar. 10, 2023 in Application No. RU2020142081 with English translation.
Taiwanese Office Action dated Mar. 23, 2021, in Appl. No. 108143150.
International Search Report and Written Opinion mailed Nov. 24, 2020, in PCT/US2019/063079.
Chinese Office Action mailed Dec. 2, 2020, in Appl. No. 201911216112.X.
JP Office Action dated Apr. 16, 2024 in JP Application No. 2020-573512.
JP Office Action dated Oct. 24, 2023 in JP Application No. 2020-573512.

* cited by examiner 1084
1064
1074
1084

1084
1074
1064
1074
1084

1064
1084
1074
1084

1084
1074
1064
1074
1084

TEMPERATURE-CONTROLLABLE REAGENT CARTRIDGE AND TEMPERATURE CONTROL SYSTEM FOR THE SAME

CROSS-REFERENCE TO RELATED APPLICATIONS

The present application claims priority to U.S. Provisional Patent Application No. 62/774,000 filed on Nov. 30, 2018 and entitled "Temperature-Controllable Reagent Cartridge and Temperature Control System for the Same," which is hereby incorporated herein by reference in its entirety.

BACKGROUND

Various analysis instruments, such as genomic sequencing systems, may utilize an assortment of reagents during various analysis operations. Such instruments may utilize a cartridge-based framework in which the various consumable elements are provided in one or more removable cartridges, e.g., a flowcell cartridge, a reagent cartridge, and/or a wash cartridge.

Such instruments may flow small amounts of different reagents through various channels and flow paths within, for example, a flow cell to support various analysis operations. The amount, timing, and handling of each reagent dose may vary depending on the analysis being performed and the stage of the analysis.

SUMMARY

In some analysis instruments utilizing reagents, some or all of the reagents may be kept at or below one or more corresponding specified temperatures during analysis operations. Other reagents may be usable at different temperatures, such as room temperature. In such systems, the cartridge containing the reagents may be kept in a temperature-controlled environment within the analysis instrument, e.g., a refrigerated chamber or a chamber in which thermoelectric coolers are placed in close proximity to the reagent cartridge to cool the exterior of the cartridge. Such a system may cool reagents that are maintained below the corresponding specified temperature and other reagents that can be maintained above the corresponding specified temperature or other components of the instrument that do not need to be cooled below the corresponding specified temperature.

In the present disclosure, a reagent cartridge is provided in which internal flow paths within the cartridge allow for a temperature-controlled fluid (i.e., a gas, such as air, or a liquid) to be circulated within the cartridge between one or more individual reagent reservoirs housed therein before being evacuated from the cartridge. Some such cartridges may have a centrally located cluster of reagent reservoirs at least partially located within an interior plenum volume that is defined by the cartridge housing, as well as an inlet and an outlet through the cartridge housing that are located outside of the cluster of reagent reservoirs. Such inlets and outlets may be fluidically connected with the interior plenum volume by corresponding flow passages. In some cases, there may be larger secondary reagent reservoirs that are located outside of the cluster, and the flow passages may be located in between such secondary reagent reservoirs. Such offset mounting between the coolant gas inlets/outlets and the cluster of reagent reservoirs allows for targeted temperature control of some reagent reservoirs that are positioned at locations in the cluster closer to the inlet while other reagent reservoirs with less sensitive reagents may be positioned at locations in the cluster further from the inlet and thus be temperature-controlled to a lesser extent.

In addition to the above-described features, the temperature control system in the analysis unit may also feature various features that provide for enhanced, low-power temperature control of the analysis cartridge. For example, the system may feature a recirculation plenum that has an inlet/outlet that mate, respectively, with the fluid outlet port and the fluid inlet port of the cartridge; a fan or other fluid pump may cause the fluid to flow from the inlet of the recirculation plenum, through the recirculation plenum, and to the outlet of the recirculation plenum. An ambient plenum may also be provided in the temperature control system; the ambient plenum may also have an inlet and an outlet, as well as a fan or other fluid pump that causes fluid to flow from the inlet of the ambient plenum to the outlet of the ambient plenum. Thermoelectric heat pumps may be interposed between the recirculation and ambient plenums such that radiator structures on opposite sides of, and in thermally conductive contact with, the thermoelectric heat pumps may protrude into the recirculation and ambient plenums such that heat may be pumped from the recirculation plenum into the ambient plenum or vice versa. In some implementations, e.g., such as those in which the recirculation plenum may be used for cooling, the recirculation plenum may be nestled within the ambient plenum, e.g., a recirculation plenum having a cross-section with a "u" nested within an ambient plenum having a "U" cross-section, to reduce the exposed cold surfaces of the recirculation plenum and reduce condensation on the temperature control system while at the same time providing a greater hot/cold surface area for heat exchange between the two plenums.

The above discussion and the further discussion following the Brief Description of the Drawings, as well as the drawings themselves, provide discussion and examples of the concepts discussed herein, including, but not limited to, the following implementations.

In some implementations, a system may be provided that includes a reagent cartridge. The reagent cartridge may include a cartridge housing defining an interior plenum volume and designed to be received by an analysis instrument. The reagent cartridge may also include a first set of reagent reservoirs positioned, at least in part, within the interior plenum volume. In such implementations, each reagent reservoir of the first set of reagent reservoirs may be defined, in part, by a sidewall and may contain a corresponding reagent, and a first reagent reservoir of the first set of reagent reservoirs may be spaced apart from a second reagent reservoir of the first set of reagent reservoirs to form a fluid flow passage between corresponding sidewalls of the first reagent reservoir and the second reagent reservoir. The reagent cartridge may also include a fluid inlet that passes through the cartridge housing and is in fluidic communication with the interior plenum volume of the cartridge housing, the fluid inlet fluidically connecting a fluid supply port of a temperature control system of the analysis instrument with the interior plenum volume when the reagent cartridge is received by the analysis instrument. The reagent cartridge may also include a fluid outlet that passes through the cartridge housing and is in fluidic communication with the interior plenum volume of the cartridge housing, the fluid outlet fluidically connecting a fluid return port of the temperature control system of the analysis instrument with the interior plenum volume when the reagent cartridge is received by the analysis instrument. In such implementations, the fluid inlet of the cartridge may be designed to receive a fluid from the temperature control system of the analysis instrument at a predetermined temperature such that the reagent in the first reagent reservoir is at a first temperature and the reagent in the second reagent reservoir is at a second temperature that is different from the first temperature.

In some such implementations of the system, the first reagent reservoir may contain one or more reagents such as tris(hydroxypropyl)phosphine, ethanol amine, tris(hydroxymethyl)aminomethane, tris(hydroxymethyl)phosphine, or a mixture of tris(hydroxymethyl)aminomethane, acetic acid, and EDTA (ethylenediaminetetraacetic acid).

In some implementations of the system, a shortest flow path within the cartridge housing from the fluid inlet to the first reagent reservoir of the first set of reagent reservoirs may be shorter than a shortest flow path within the cartridge housing from the fluid inlet to the second reagent reservoir of the first set of reagent reservoirs.

In some implementations, the fluid inlet may be located outside of a smallest enclosing perimeter of the first set of reagent reservoirs.

In some implementations of the system, the first set of reagent reservoirs may be arranged along one or more concentric circles and the fluid inlet may be located outside of the one or more concentric circles.

In some implementations of the system, the first set of reagent reservoirs may be arranged in a cluster about a rotary valve located in the cartridge housing, there may be multiple fluid flow passages between the sidewalls of the reagent reservoirs in the first set of reagent reservoirs, and the multiple fluid flow passages may provide one or more fluidic flow paths around the rotary valve.

In some implementations of the system, the system may further include an inlet passage that fluidically connects, and is fluidically interposed between, the fluid inlet and the interior plenum volume. In such implementations, the system may also include an outlet passage that fluidically connects, and is fluidically interposed between, the fluid outlet and the interior plenum volume. In such systems, the inlet passage, the outlet passage, and the first reagent reservoir may all be located at least partially within a common quadrant of a reference circle centered on an average center point of the reagent reservoirs in the first set of reagent reservoirs.

In some implementations of the system, the reagent cartridge may further include an inlet passage that fluidically connects, and is fluidically interposed between, the fluid inlet and the interior plenum volume. The reagent cartridge of such a system may also include an outlet passage that fluidically connects, and is fluidically interposed between, the fluid outlet and the interior plenum volume. In such systems, the inlet passage may be at least partially located within a first quadrant of a reference circle centered on an average center point of the reagent reservoirs in the first set of reagent reservoirs, the outlet passage may be at least partially located in a second quadrant of the reference circle, and the first quadrant and the second quadrant may be 180° out of phase with each other, or substantially opposite from one another, about the average center point.

In some implementations of the system, a second set of reagent reservoirs may be included. In some such systems, each reagent reservoir of the second set of reagent reservoirs may be defined, in part, by a corresponding sidewall, each reagent reservoir of the second set of reagent reservoirs may contain a corresponding reagent, two of the reagent reservoirs in a first subset of the reagent reservoirs in the second set of reagent reservoirs may be spaced apart from one another to form an inlet passage between the respective sidewalls thereof, and the inlet passage may fluidically connect, and may be fluidically interposed between, the fluid inlet and the interior plenum volume. In some further implementations of such a system, two reagent reservoirs in a second subset of the reagent reservoirs in the second set of reagent reservoirs may be spaced apart from one another to form an outlet passage between the respective sidewalls thereof, the outlet passage may fluidically connect, and may be fluidically interposed between, the fluid outlet and the interior plenum volume, and the first subset and the second subset may not be identical. In some yet further implementations, the reagent reservoirs in the second set of reagent reservoirs may be arranged around an outer perimeter of the interior plenum volume, and portions of the sidewalls of at least some of the reagent reservoirs in the second set of reagent reservoirs may define, at least in part, the outer perimeter of the interior plenum volume.

In some implementations, the system may further include the analysis instrument, which may include the temperature control system. The temperature control system may include a recirculation plenum with a plenum inlet and a plenum outlet, a first fluid pump fluidically interposed between the plenum inlet of the recirculation plenum and the plenum outlet of the recirculation plenum and configured to urge fluid within the recirculation plenum from the plenum inlet of the recirculation plenum towards the plenum outlet of the recirculation plenum when activated, and one or more thermoelectric heat pumps, each thermoelectric heat pump in thermally conductive contact with a corresponding first radiator structure positioned within the recirculation plenum. In such a system, the plenum inlet of the recirculation plenum may be fluidically connected with the fluid return port, and the plenum outlet of the recirculation plenum may be fluidically connected with the fluid supply port. In some such implementations of the system, the temperature control system may further include an ambient plenum with a plenum inlet and a plenum outlet, as well as a second fluid pump fluidically interposed between the plenum inlet of the ambient plenum and the plenum outlet of the ambient plenum and configured to urge fluid within the ambient plenum from the plenum inlet of the ambient plenum towards the plenum outlet of the ambient plenum when activated. In such a system, each thermoelectric heat pump may also be in thermally conductive contact with a corresponding second radiator structure positioned within the ambient plenum. In some yet further implementations of the system, a cross-section of the recirculation plenum for at least a portion of the recirculation plenum may be nested within a corresponding cross-section of the ambient plenum for at least a corresponding portion of the ambient plenum.

In some implementations, an analysis instrument may be provided that includes a cartridge receptacle configured to receive a reagent cartridge containing a plurality of liquid reagents. The analysis instrument may also include a temperature control system include a recirculation plenum with a plenum inlet and a plenum outlet, an ambient plenum with a plenum inlet and a plenum outlet, a first fluid pump fluidically interposed between the plenum inlet of the recirculation plenum and the plenum outlet of the recirculation plenum and configured to urge fluid within the recirculation plenum from the plenum inlet of the recirculation plenum towards the plenum outlet of the recirculation plenum when activated, a second fluid pump fluidically interposed between the plenum inlet of the ambient plenum and the plenum outlet of the ambient plenum and configured to urge fluid within the ambient plenum from the plenum inlet of the ambient plenum towards the plenum outlet of the ambient plenum when activated, one or more thermoelectric heat pumps, each thermoelectric heat pump in thermally conductive contact with a corresponding first radiator structure positioned within the recirculation plenum, a fluid supply port, and a fluid return port. In such an analysis instrument, the plenum inlet of the recirculation plenum may be fluidically connected with the fluid return port, and the plenum outlet of the recirculation plenum may be fluidically connected with the fluid supply port.

In some such implementations, a cross-section of the recirculation plenum for at least a portion of the recirculation plenum may be nested within a corresponding cross-section of the ambient plenum for at least a corresponding portion of the ambient plenum.

In some implementations of the analysis instrument, the analysis instrument may further include the reagent cartridge, which may, in turn, include a cartridge housing defining an interior plenum volume and configured to be received by the cartridge receptacle of the analysis instrument. The reagent cartridge may also include a first set of reagent reservoirs positioned, at least in part, within the interior plenum volume of the cartridge housing. In such implementations, each reagent reservoir of the first set of reagent reservoirs may be defined, in part, by a sidewall and may contain a corresponding reagent, and a first reagent reservoir of the first set of reagent reservoirs may be spaced apart from a second reagent reservoir of the first set of reagent reservoirs to form a fluid flow passage between corresponding sidewalls of the first reagent reservoir and the second reagent reservoir. Such reagent cartridges may also include a fluid inlet that passes through the cartridge housing and is in fluidic communication with the interior plenum volume of the cartridge housing, the fluid inlet fluidically connecting the fluid supply port with the interior plenum volume, and a fluid outlet that passes through the cartridge housing and is in fluidic communication with the interior plenum volume of the cartridge housing, the fluid outlet fluidically connecting the fluid return port with the interior plenum volume. In such reagent cartridges, the fluid inlet of the cartridge may be designed to receive a fluid from the temperature control system of the analysis instrument at a predetermined temperature such that the reagent in the first reagent reservoir is at a first temperature and the reagent in the second reagent reservoir is at a second temperature that is different from the first temperature.

In some implementations, a method may be provided that includes (a) providing a reagent cartridge having: a cartridge housing defining an interior plenum volume, a fluid inlet that passes through the cartridge housing, a fluid outlet that passes through the cartridge housing, and a first set of reagent reservoirs positioned, at least in part, within the interior plenum volume of the cartridge housing. In such implementations, each reagent reservoir of the first set of reagent reservoirs may be defined, in part, by a sidewall and contains a corresponding reagent, and a first reagent reservoir of the first set of reagent reservoirs may be spaced apart from a second reagent reservoir of the first set of reagent reservoirs to form a fluid flow passage between corresponding sidewalls of the first reagent reservoir and the second reagent reservoir. The method may also include (b) inserting the reagent cartridge into an analysis instrument, (c) connecting a fluid supply port of a temperature control system of the analysis instrument to the fluid inlet of the cartridge housing, (d) connecting a fluid return port of the temperature control system of the analysis instrument to the fluid outlet of the cartridge housing, and (e) activating the temperature control system to cause fluid at a first predetermined temperature to flow from the fluid supply port to the fluid inlet, from the fluid inlet to the interior plenum volume within the cartridge, from the interior plenum volume to the fluid outlet, and from the fluid outlet to the fluid return port to cause the reagent in the first reagent reservoir to be at a first temperature and the reagent in the second reagent reservoir to be at a second temperature that is different from the first temperature.

In some implementations of the method, a shortest flow path within the cartridge housing from the fluid inlet to the first reagent reservoir of the first set of two or more reagent reservoirs may be shorter than a shortest flow path within the cartridge housing from the fluid inlet to the second reagent reservoir of the first set of two or more reagent reservoirs, and the performance of (e) may cause the fluid to flow from the fluid inlet to both the first reagent reservoir and the second reagent reservoir along the respective shortest flow paths to the first reagent reservoir and the second reagent reservoir, respectively.

In some implementations of the method, the first predetermined temperature may be within about 0° C. to about 20° C., and the reagent contained in the first reagent reservoir may include one or more of: tris(hydroxypropyl)phosphine, ethanol amine, tris(hydroxymethyl)aminomethane, tris(hydroxymethyl)phosphine, and a mixture of tris(hydroxymethyl)aminomethane, acetic acid, or EDTA (ethylenediaminetetraacetic acid).

BRIEF DESCRIPTION OF THE DRAWINGS

The various implementations disclosed herein are illustrated by way of example, and not by way of limitation, in the figures of the accompanying drawings, in which like reference numerals refer to similar elements.

The above Figures are merely representative examples of implementations falling within the scope of this disclosure and the disclosure is to be understood as not being limited to only the implementations depicted in the Figures. Other implementations will be apparent to those of ordinary skill in the art and are also considered to be within the scope of this disclosure.

DETAILED DESCRIPTION

Figure 1:
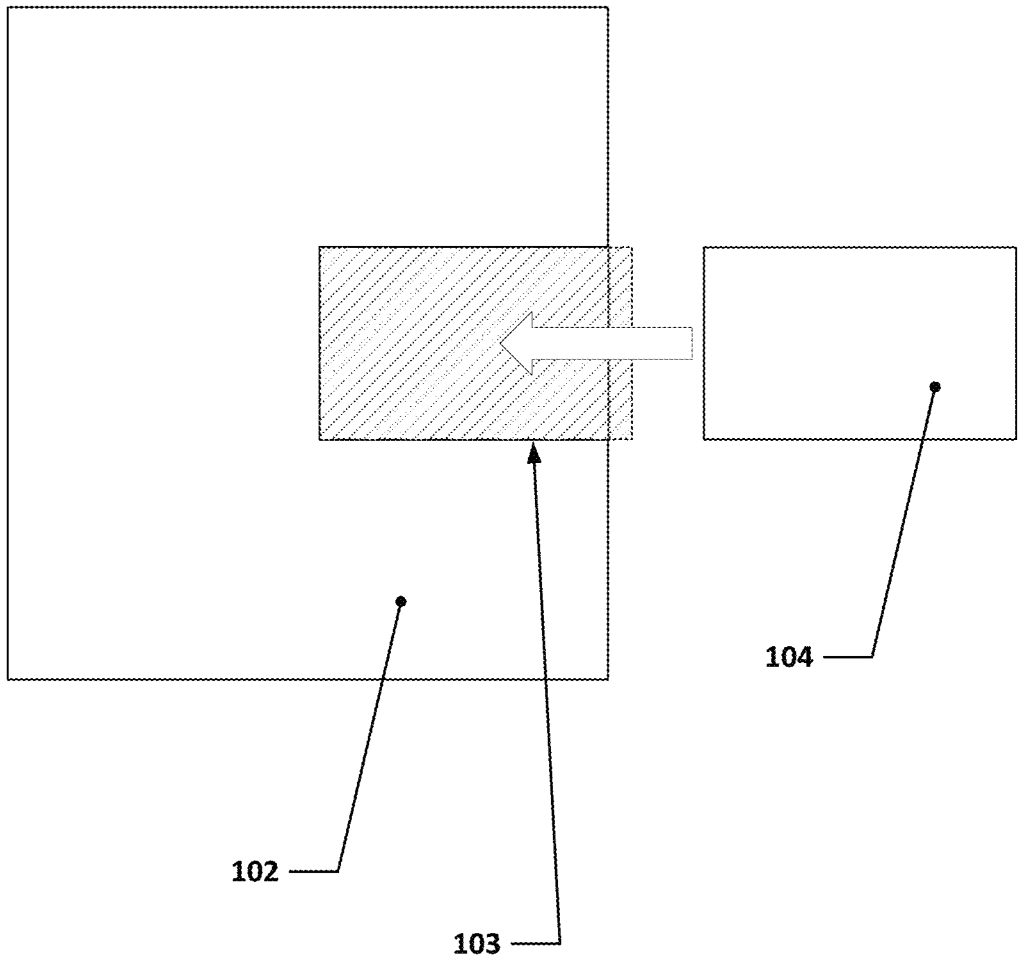
FIG. 1 depicts an example analysis instrument and a removable cartridge thereof.

FIG. 1 depicts an example analysis instrument and a removable cartridge thereof. In FIG. 1, analysis instrument 102 is provided and includes a receptacle, slot, or other interface 103 that is configured to receive a reagent cartridge 104, which may be similar to a reagent cartridge described below.

Figure 2:
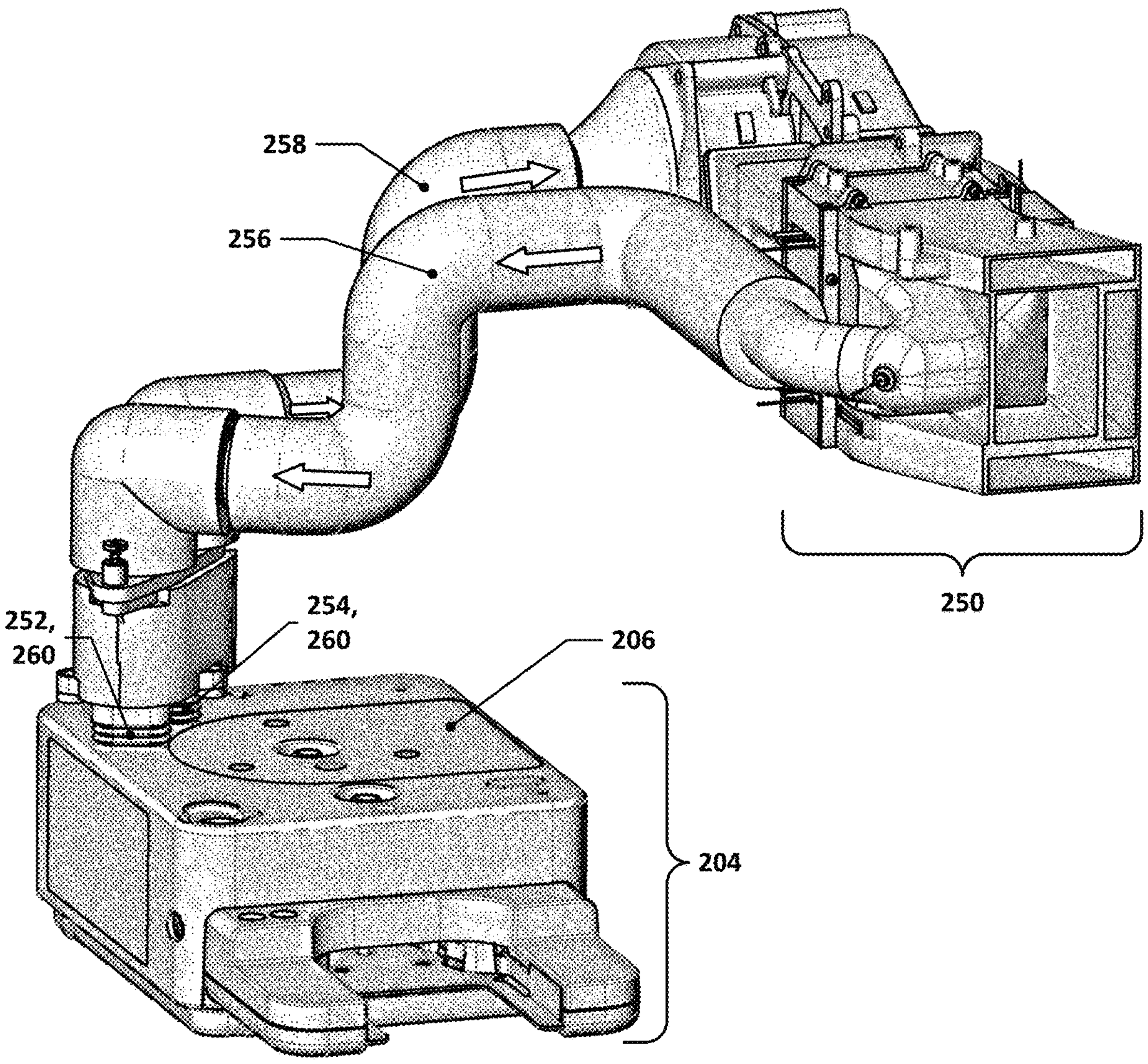
FIG. 2 depicts the example removable cartridge of FIG. 1 as well as a temperature control system for the analysis instrument.

As mentioned earlier, analysis instruments such as that pictured in FIG. 1 may include a temperature control system that may interface with a removable cartridge (also referred to herein as a "reagent cartridge") to provide for temperature control of the cartridge while the cartridge is installed in the analysis instrument. FIG. 2 depicts the example removable cartridge of FIG. 1 as well as a temperature control system for the analysis instrument. While the remainder of the analysis instrument 202 is not shown, the temperature control system 250 and the cartridge 204 are both depicted in the relative positioning that such items would be in after the cartridge 204 is inserted into the analysis instrument 202.

While not shown in FIG. 2, one or more guides or other devices within the analysis instrument 202 may cause the cartridge 204 to be positioned in a predetermined location relative to the temperature control system 250 after the cartridge 204 is fully inserted or installed into the analysis instrument 202. The analysis instrument 202 may include a slot, receptacle, or other interface that is configured to receive the cartridge, ensure that it is properly oriented, and secure it in place such that analysis operations may be performed by the analysis instrument 202 using the cartridge 206. Such positioning may cause a gas inlet and a gas outlet (not shown in FIG. 2) on the cartridge 204 to be aligned relative to a gas supply port 252 and a gas return port 254, respectively, that may be fluidically connected with the temperature control system 250 by a gas supply duct 256 and a gas return duct 258, respectively. To reduce the potential for leakage of the gas that is flowed into and out of the cartridge 204, the gas supply port 252 and the gas return port 254 may, in some implementations, be equipped with flexible bellows 260 or other types of compliant seals that may elastically compress against the cartridge housing 206 of the cartridge 204 when the cartridge 204 is brought into contact with the flexible bellows 260. For example, in some implementations, the cartridge 204 may be caused, e.g., through operation of a loading mechanism or other interface, to move vertically upwards (with respect to the Figure orientation) and into contact with the flexible bellows 260 during installation of the cartridge 204 into the analysis instrument 202; in yet other implementations, the flexible bellows 260 may be supported by a movable interface 262 that may be slightly lowered or raised by an actuation mechanism (not shown) after the cartridge 204 is fully inserted into the analysis instrument 202 in order to bring the flexible bellows 260 into or out of contact with the cartridge housing 206.

During operation of the temperature control system 250, a temperature-control gas (also simply referred to herein in unhyphenated form as a "temperature control gas") may be caused to be flowed from the temperature control system 250, to the gas supply port 252 via the gas supply duct 256, and into the cartridge 204; exhaust gas from the cartridge 204 may be returned to the temperature control system 250 through gas return port 254 and via the gas return duct 258. The temperature control gas may be air, although alternate temperature control gases may be used as well, if desired, e.g., nitrogen, argon, etc. The temperature control system 250 may be configured to control the temperature of the temperature control gas, e.g., through heating and/or cooling it, so as to provide temperature control gas at a predetermined temperature to the cartridge 204.

It will be understood that while the present discussion largely focuses on temperature control systems and temperature-controllable cartridges that utilize a temperature control fluid that is a gas, the concepts discussed herein may also be used in systems in which the temperature control fluid is a liquid, e.g., water. In systems utilizing a liquid, it may be preferable to ensure that the flow paths followed by the temperature control fluid are all sealed to a sufficient degree that leakage of the temperature control fluid will not occur. In systems using a temperature control fluid that is a gas, however, some degree of leakage may be acceptable—particularly if the temperature control fluid is air, which does not require a separate supply source (being available from the ambient environment) and poses no safety risk to users in the event of a leak. In this disclosure, the phrases "temperature control fluid" and "temperature control gas" may be used relatively interchangeably, although it should be understood that in temperature control systems using liquids, the "temperature control gas" or "temperature control fluid" may be replaced by "temperature control liquid" instead.

Figure 3:
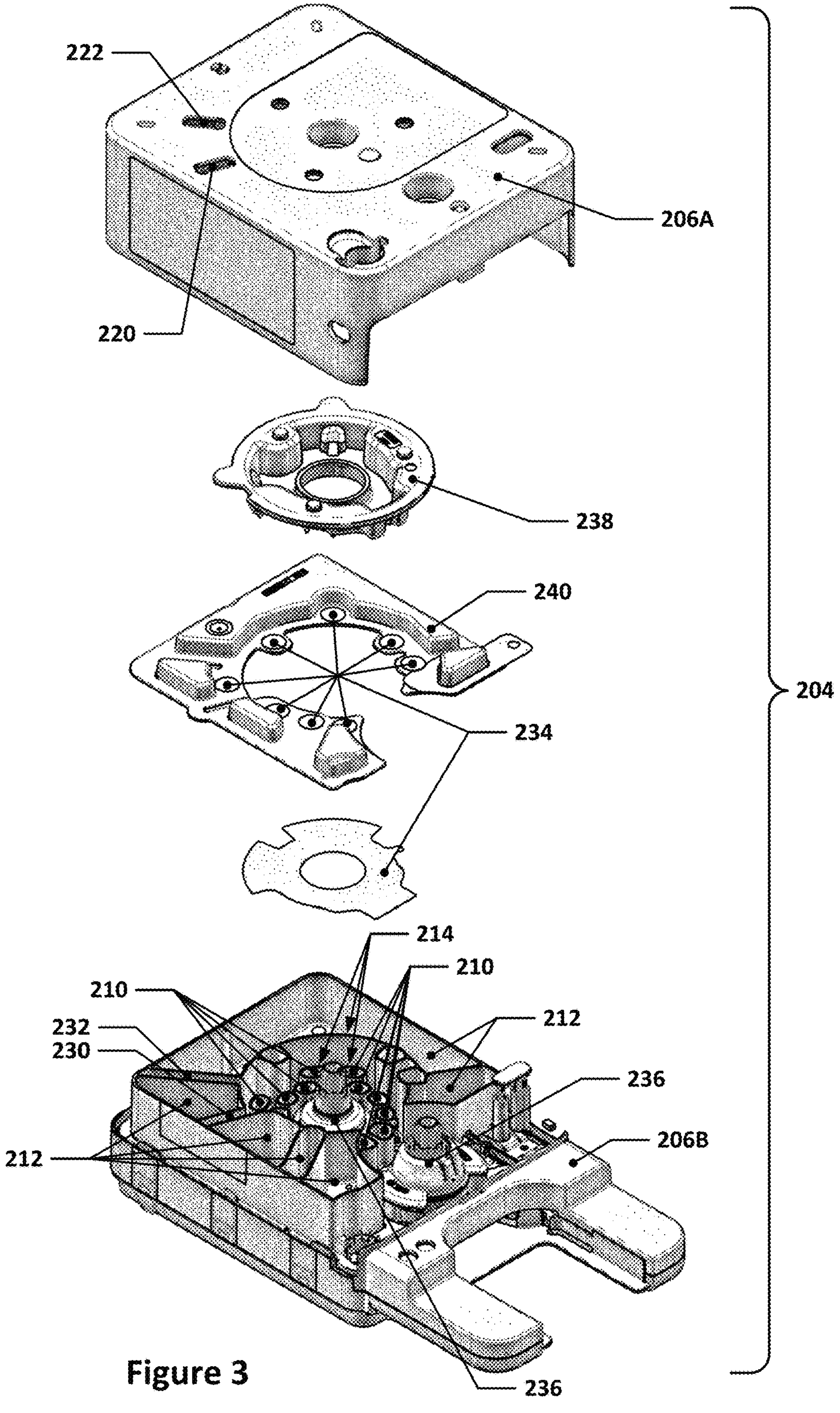
FIG. 3 depicts an exploded view of an example removable cartridge for an analysis instrument.

While not evident in FIG. 2, the cartridge 204 may house a number of reagent reservoirs that each contain a different reagent, one or more of which may be caused to be used during analysis by the analysis instrument; an example internal structure of such a cartridge 204 may be seen in FIG. 3, which depicts an exploded view of an example removable cartridge for an analysis instrument.

In FIG. 3, the cartridge housing 206 of the cartridge 204 of FIG. 2 is shown with a top portion 206A removed from a bottom portion 2066. As can be seen, the top portion 206A includes a gas inlet 220 and a gas outlet 222. The gas inlet 220 and the gas outlet 222 are, in this case, openings or apertures formed in the outer wall of the cartridge housing 206; in other implementations, such openings or apertures may be provided by separate components that may be installed in the cartridge housing 206, e.g., fittings. It will be understood that there may also be multiple gas inlets and/or multiple gas outlets in a cartridge, e.g., there may be a cluster of smaller openings that are designed to all receive temperature control gas from a single source or vent the temperature control gas out of the cartridge and that, in concert, serve in the same capacity as the depicted gas inlet 220 or the depicted gas outlet 222, although each such smaller opening may individually be thought of as a gas inlet 220 or a gas outlet 222, as appropriate, as well. In other implementations, there may be multiple gas inlets 220 and/or multiple gas outlets 222 located at different locations, e.g., not part of a cluster of smaller openings that function in aggregate as a single gas inlet or gas outlet. In such implementations, such gas inlets or gas outlets may provide alternate routes for introducing or removing temperature control gas to or from the reagent cartridge. Regardless of how such gas inlets/outlets are provided, the gas inlet 220 and the gas outlet 222 may pass through the cartridge housing 206 and provide a mechanism by which temperature control fluid may be introduced to and removed from an interior plenum volume of the cartridge 204, i.e., the gas inlet 220 and the gas outlet 222 may be in fluidic communication with, or be fluidically connected with, the interior plenum volume within the cartridge housing.

Fluidic communication, as the phrase is used herein, refers to a state in which two or more volumes are connected by one or more passages, orifices, or other features such that fluid may flow between them. Generally speaking, the phrase should be understood to imply that there is some form of structure providing the fluidic communication, rather than just exposure to the ambient environment. For example, two open-topped buckets positioned side-by-side in upright positions would not be considered to be in "fluidic communication" (even though fluid, e.g., gas, could conceivably waft of diffuse from one bucket to the other), whereas placing an end of a hose into each of those same two open-topped buckets would cause the buckets to be viewed as being in "fluidic communication" with each other since there is structure that serves to provide a fluid flow passage between them.

Fluidically connecting or a fluidic connection, as the phrases are used herein, refers to a making a connection, or to a connection, that is fluidic in nature, i.e., similar to how "electrically connecting" may be used to describe a connection capable of supporting a electrical current flow in an electrical system, "fluidically connecting" may be used to refer to a connection capable of supporting a fluid flow in a fluidic system. It will be understood that two components can be fluidically connected either directly, i.e., where there are no other components in between the two components through which fluid must flow for fluid from one component to reach the other, or indirectly, i.e., where one or more intermediate components are fluidically interposed between the two components. A fluidic connection may be hermetic, i.e., without allowing noticeable leakage of fluid, but may also be non-hermetic in nature. For example, the bellows 260 may form a generally tight seal against the housing 206, but there may still be leakage of temperature control gas from such an interface. Generally speaking, a fluidic connection between two components may be deemed to exist if the components are arranged such that at least 50% or more of the fluid flowing out of an opening in one component enters into a corresponding opening or region in another component. Thus, for example, a cartridge that is inserted into an analysis instrument such that temperature control gas that is flowed from a temperature control system within the analysis unit largely flows into a gas inlet on the cartridge would be considered to be fluidically connected with the gas inlet and the temperature control system. However, when the cartridge is removed from the system, the fluidic connection would be considered to be broken and to have ceased to exist—this is despite the fact that, in theory, some of the temperature control gas that is pumped out of the temperature control system could still eventually diffuse into the open air and reach the gas inlet on the cartridge. In such instances, however, only a very small fraction of such temperature control gas would enter the cartridge and no fluidic connection would be viewed as existing.

The bottom portion 206B of the cartridge housing 206, in this example, includes a plurality of reservoirs that may each contain a reagent that may be used by the analysis instrument during analysis. In this example, there are ~25 such reagent reservoirs, which, for discussion purposes, may be referred to herein as first reagent reservoirs 210 or second reagent reservoirs 212. This disclosure may also refer to different sets of reagent reservoirs, e.g., a first set of reagent reservoirs (e.g., some or all of the first reagent reservoirs), a second set of reagent reservoirs (e.g., some or all of the second reagent reservoirs), and so on. It will be understood that various cartridge implementations may feature different numbers and arrangements of reagent reservoirs, and that such alternative variants are considered to also be within the scope of this disclosure.

The cartridge 204 may include a microfluidic plate (not shown) that includes a plurality of flow channels, each of which may be fluidically connected with one of the reagent reservoirs. To allow for the reagents to be selectively flowed through the channels of the microfluidic plate, one or more valves, such as rotary valves 236 may be included in the cartridge 204. Such rotary valves 236 may be configured to have a rotatable portion that may be caused to be rotated, e.g., by a rotational input provided by the analysis instrument 202, to cause different reagent reservoirs to be in fluidic communication with one or more reagent flow passages within the microfluidic plate at different times.

The reagent reservoirs in cartridge 204 are, in this example, each defined by one or more sidewalls 214 that rise up from a floor (such as the microfluidic plate) and are capped, in the case of the first reagent reservoirs 210, by a foil seal 234 that may be adhered or bonded to an upper edge of the sidewalls 214 of the first reagent reservoirs 210. In the case of the second reagent reservoirs 212, a reservoir cap 240 that has additional foil seals 234 that are attached to it may be adhered or bonded to an upper edge of the sidewalls 214 of those second reagent reservoirs 212. The foil seals 234 may be provided to seal the reagent reservoirs and prevent leakage of the reagents contains within. When the cartridge 204 is installed in the analysis instrument 202, the analysis instrument 202 may cause a puncture disk 238 to be actuated. The puncture disk 238 may have a plurality of protrusions that are each positioned over the foil seal that seals a particular reservoir such that when the puncture disk 238 is actuated towards the reagent reservoirs, the protrusions puncture the foil seals 234, thereby allowing the reagents to be withdrawn from the reagent reservoirs (if the seals are not punctured to allow venting of the reagent reservoirs, it may not be possible for the analysis instrument 202 to cause the reagents to be withdrawn from the reagent reservoirs due to pressure effects). In some implementations, the top portion 206A of the cartridge housing 206 and/or the reservoir cap 240 and foil seals 234 may be removeable or replaceable such that new reagent may be added to the first reagent reservoirs 210 and second reagent reservoirs 212 to refill or recycle the cartridge 204. For example, in some implementations, during its normal and intended use, cartridge 204 is recyclable or re-fillable. More specifically, the top portion 206A of housing 206 may be removably coupled to the lower portion 206B and/or other portions of the housing 206 such that the top portion 206A of housing 206 can be manually separated or removed from cartridge 204 by a user. The reservoir cap 240 and other arrangements or designs of elements housed within lower portion 206B of housing 206 can thereby be exposed, rendering these design configurations and arrangements visible and accessible to the user. In some implementations, a plurality of flow channels is visible when top portion 206A is removed. By virtue of these implementations, reservoirs 210 and reservoirs 212 of cartridge 204 may be refilled, thereby allowing cartridge 204 to be refilled and/or recycled at some point during its commercial life as part of its normal and intended use. It will be understood that other implementations may feature other arrangements or designs of reagent reservoirs, and the present disclosure is not limited to only the particular implementation shown. For example, some implementations may not utilize foil seals for the tops of the reservoirs.

In this example, the first reagent reservoirs 210 are clustered together near the center of the cartridge 204, with the second reagent reservoirs 212 arranged around the periphery of the cluster of first reagent reservoirs 210. Some of the second reagent reservoirs 212, in this example, are spaced apart from one another such that a passage is defined between them. For example, the sidewalls 214 of two of the second reagent reservoirs 212 may be spaced apart from one another to form an inlet passage 230 that fluidically connects the gas inlet 220 with an interior plenum volume or space that surrounds or partially surrounds the first reagent reservoirs 210; put another way, the inlet passage 230 may be fluidically interposed between the gas inlet 220 and the interior plenum volume 208. Similarly, the sidewalls 214 of two of the second reagent reservoirs 212 may be spaced apart from one another to form an outlet passage 232 that fluidically connects the gas outlet 222 with the interior plenum volume 208 or space that surrounds the first reagent reservoirs 210, i.e., the outlet passage 232 may be fluidically interposed between the gas outlet 222 and the interior plenum volume. In this particular example, portions of the sidewall(s) 214 of one of the second reagent reservoirs 212 define both part of the inlet passage 230 and the outlet passage 232, although in other implementations, the inlet passage 230 and the outlet passage 232 may be defined by completely different sets of second reagent reservoirs 212. In yet other implementations, one or both of the inlet and outlet passages, if used, may be provided by structures that are independent of a reagent reservoir sidewall, e.g., sidewalls that do not serve to define a reagent reservoir may be provided in order to define the inlet passage and/or the outlet passage.

Fluidically interposed, as the phrase is used herein, refers to a condition where fluid flowing from a first component to a second component generally flows through a third component before reaching the second component; the third component would be described as being fluidically interposed between the first and second components. For example, a furnace may be connected with a heating register by a duct; the duct would be described as being fluidically interposed between the furnace and the heating register since the heated air from the furnace would generally flow through the duct before reaching the heating register. In systems using gas as the fluid, there may be some leak paths or other flow paths that allow for the fluid to flow from one component to another without flowing through a component that is fluidically interposed between those two components, but it should be understood that if the majority of the fluid that flows between those two components passes through a third component before reaching the latter of the two components, then that third component may still be deemed to be "fluidically interposed" between the two components. It will be further understood that a component that is fluidically interposed between two other components does not necessarily mean that the component is physically located in between the other two components. For example, components A, B, and C may be physically arranged in a line in that order, with B physically located between A and C. However, hoses may connect A to C and then C to B such that C is fluidically interposed between A and B.

Figure 4:
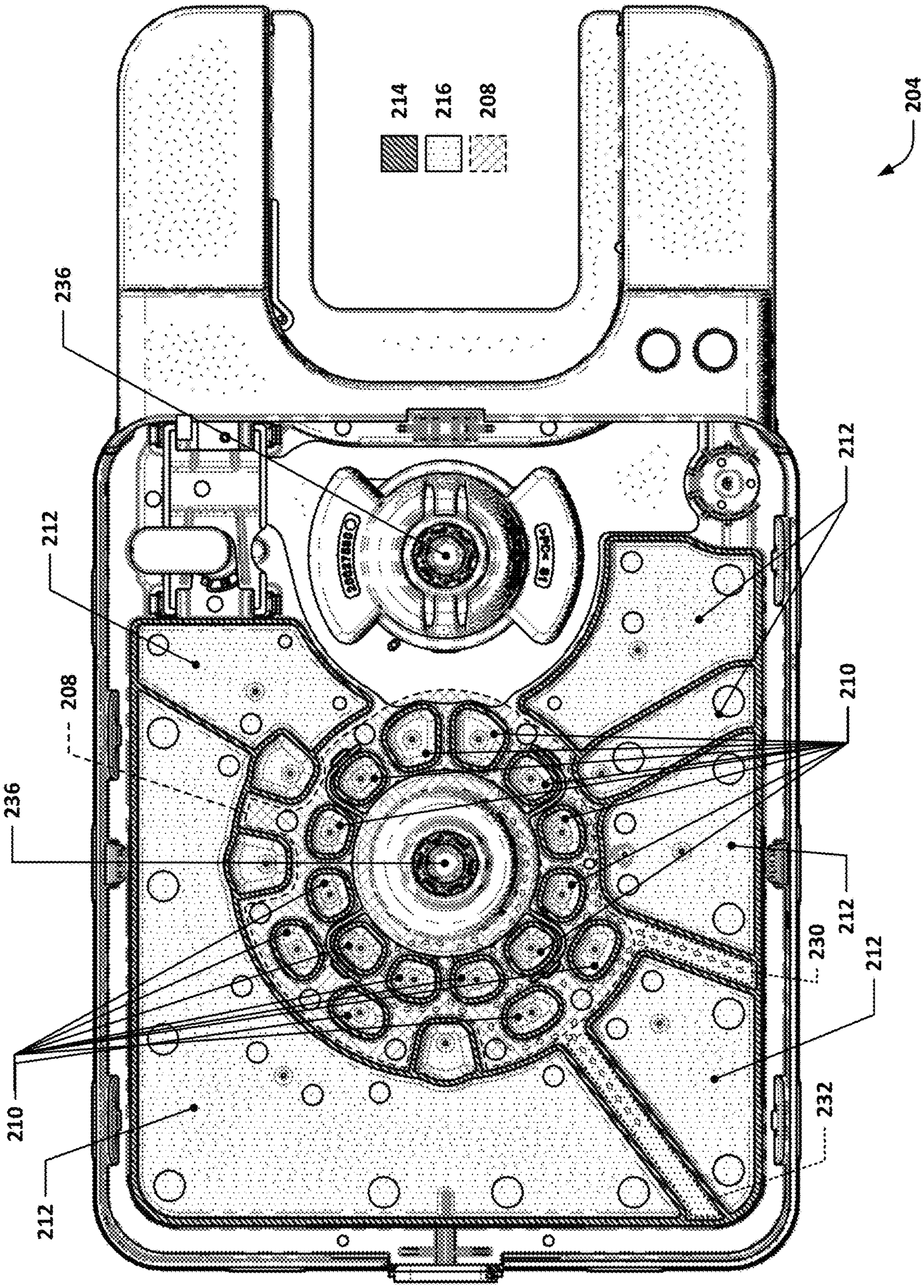
FIG. 4 depicts a top sectional view of the example removable cartridge from FIG. 3.
Figure 5:
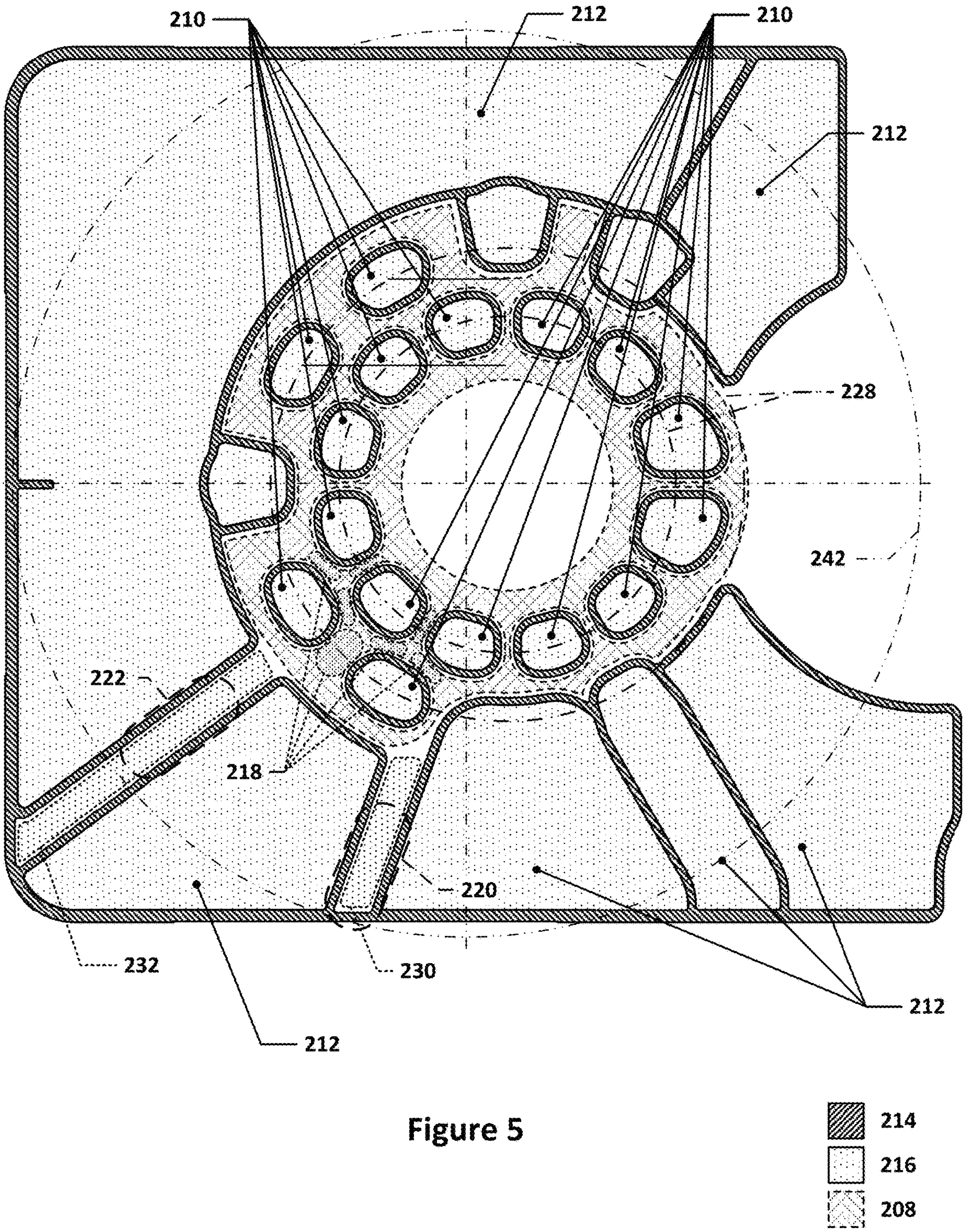
FIG. 5 depicts a more detailed view of a section of the example removable cartridge from FIG. 4.

To assist in better understanding, FIG. 4 depicts a top sectional view of the example removable cartridge from FIG. 3. FIG. 5 depicts a more detailed view of a slice section of the example removable cartridge from FIG. 4 (with remainder of cartridge not shown). As can be seen in FIGS. 4 and 5, each first reagent reservoir 210 and each second reagent reservoir 212 may contain a reagent 216. The reagents 216 may be liquid reagents, although one or more of the reagents 216 may be solid, e.g., powderized or pulverized reagent that may be reconstituted with a liquid prior to use, or gaseous in some implementations. As used herein, the term "reagent" refers to substances that may be transported through the cartridge during analysis operations, as well as other operations (such as cleaning or wash operations). Such reagents may include fluorescent labels, dyes, wash fluids, buffer solutions, etc.; while most of the reagents may chemically react in some way, either with each other or with a sample being analyzed, some of the reagents may be generally non-reactive with other reagents, e.g., a wash fluid or a reconstitution fluid that may be used to dissolve a dry reagent into a liquid form. As discussed earlier, some of these reagents may be more sensitive to temperature than other reagents. For example, reagents including organic phosphines or organic amines, e.g., tris(hydroxypropyl)phosphine (also referred to as THP or THM), ethanol amine, tris(hydroxymethyl)aminomethane (also referred to as TRIS), tris(hydroxymethyl)phosphine, and/or TAE (a mixture of tris(hydroxymethyl)aminomethane, acetic acid, and EDTA (ethylenediaminetetraacetic acid)) may need to be cooled to lower temperatures to promote the stability and longevity of the reagents—this may be particularly important in analysis instruments that may be in more or less continuous operation over long periods of time, e.g., 24 to 48 hours. For example, in some implementations, some of the reagents used may need to be cooled to a temperature of between 0 degrees Celsius (° C.) and 20° C.

In FIGS. 4 and 5, the sidewalls 214 of the reagent reservoirs are indicated with diagonal cross-hatching (see the legend at right for an example), and the reagents 216 contained within the reservoirs are indicated with dot-shading. As noted above, the first reagent reservoirs 210 may be located within an interior plenum volume 208. As can be seen in FIG. 5, the first reagent reservoirs 210 may be arranged such that there are gaps in between their respective sidewalls 214 that define a plurality of fluid flow passages 218. The fluid flow passages 218 may be located within the interior plenum volume 208 and may be fluidically connected therewith and with the gas inlet 220 and the gas outlet 222 such that temperature control fluid, e.g., gas, that is flowed into the cartridge 204 via the gas inlet 220 flows through the fluid flow passages 218 between at least some of the first reagent reservoirs 210 before exiting the cartridge, e.g., via the gas outlet 222 or other exit paths.

Also visible in FIG. 5 is a reference circle 242 which is divided into four quadrants and centered on the average center point of the first reagent reservoirs 210 that are shown. For clarity, the average center point refers to the average XY coordinates of 16 first reagent reservoirs, i.e., the coordinate pair resulting from averaging all of the X coordinates and all of the Y coordinates for those first reagent reservoirs 210. For averaging purposes, the XY coordinates of each first reagent reservoir 210 may be evaluated at the center or centroid of each first reagent reservoir 210. As can be seen, the inlet passage 230 and the outlet passage 232 are both located within the same quadrant of the reference circle 242. In other implementations, as is discussed later, the inlet passage 230 and the outlet passage 232 may be located in different, non-adjacent quadrants of such a reference circle.

In some implementations, the first reagent reservoirs 210 may be arranged such that at least two of the first reagent reservoirs 210 experience different amounts of heat removal or heat addition, and thus different amounts of cooling or heating, respectively, when temperature control fluid at a particular temperature is flowed through the gas inlet 220 and into the interior plenum volume 208. Such variation in heating or cooling may be caused, for example, by locating such first reagent reservoirs 210 within the interior plenum volume 208 such that the shortest flow paths within the housing 206 from the gas inlet 220 to each of at least two of such first reagent reservoirs 210 are of different lengths. The temperature control fluid that then flows through the interior plenum volume 208 may, as it flows through the interior plenum volume 208, experience heat flow to or from the sidewalls 214 of the first reagent reservoirs 210 that it flows past, causing the temperature control fluid to either cool down or heat up as it flows, thus reducing the temperature gradient between the sidewalls 214 of the first reagent reservoirs 210 and the temperature control fluid, which reduces the rate of heat flow to or from the first reagent reservoirs 210. Thus, a first reagent reservoir 210 with a shortest flow path to the gas inlet 220 that is less than a shortest flow path from the gas inlet 220 to another first reagent reservoir may experience more heating or cooling (depending on whether the temperature control gas is being heated or cooled by the temperature control system 250) than the first reagent reservoir 210 that has a longer shortest flow path to the gas inlet 220. By leveraging this reduction in cooling or heating efficiency, such cartridges 204 may be able to allow different reagents to be held at different temperatures within the cartridge while accepting temperature control fluid from a single supply source, e.g., the temperature control system 250.

In this example, the first reagent reservoirs within the quadrant of the reference circle 242 that contains the inlet passage 230 have shorter shortest flow paths to the gas inlet 220 (indicated with a dashed outline; the gas outlet 222 is also indicated with a dashed line) than the first reagent reservoirs 210, for example, located in the quadrant of the reference circle 242 on the opposite side of the reference circle, i.e., 180° out of phase with the quadrant containing the inlet passage 230.

In the depicted cartridge example, each of the first reagent reservoirs 210 is generally free-standing within the interior plenum volume 208, e.g., the sidewalls 214 of the first reagent reservoirs 210 are not shared by any adjacently located first reagent reservoirs 210 (or other reservoirs), and there are fluid flow passages 218 between each first reagent reservoir 210 and all of the first reagent reservoirs 210 immediately adjacent thereto. In other implementations, however, two or more of the first reagent reservoirs 210 may share one or more sidewalls in common.

In the particular example shown, the first reagent reservoirs 210 are generally arranged along two concentric circles 228 centered on one of the rotary valves 236, which may be an arrangement that is particularly well-suited for cartridges featuring such rotary valves 236. For clarity, "arranged along a circle" means generally arranged such a portion of each item so arranged lies on, or intersects with, the circle (which, it will be understood, need not be a "visible" circle, i.e., it may be a reference circle). For example, the rotary valve 236 that is in the center of the concentric circles 228 may be fluidically connected to each of the first reagent reservoirs 210 by a flow path in a microfluidic plate that forms the floor of the first reagent reservoirs 210; such flow paths may radiate outward to corresponding drain holes in the first reagent reservoirs 210. The arrangement shown allows for a very compact layout of similarly sized first reagent reservoirs 210 clustered about the rotary valve 236 while also allowing for a large number of fluid flow passages 218 to distribute the temperature control fluid to the various first reagent reservoirs, thereby facilitating flow of the temperature control fluid around that rotary valve 236. In the arrangement shown, the first reagent reservoirs 210 that are closest to the gas inlet 220 and inlet passage 230 may experience more heating or cooling when a temperature control fluid is pumped into the interior plenum volume 208 from the gas inlet 220 than the first reagent reservoirs 210 that are further from the gas inlet 220. Thus, reagents 216 that may need to be kept at higher or lower temperatures relative to other reagents 216 may be stored in the first reagent reservoirs 210 that are closer to the gas inlet 220 than those reagents 216 that may have less stringent temperature requirements. In some implementations in which multiple first reagent reservoirs are arranged along a circle or circles, the gas inlet and/or the gas outlet may be located outside of the largest of such circles, as is shown in FIG. 5; in other implementations, however, the gas inlet or the gas outlet may be located at least partially within one of the one or more circles.

The depicted example also features a plurality of second reagent reservoirs 212 that are arranged around the interior plenum volume 208; in this case, some of the sidewalls 214, e.g., the arcuate portions of the sidewalls 214 that are concentric with the circles 228, of the second reagent reservoirs 212 actually partially define part of the interior plenum volume 208, although other implementations may otherwise define the interior plenum volume 208. Put another way, the second reagent reservoirs may be arranged around an outer perimeter of the interior plenum volume and portions of the sidewalls 214 thereof may actually define, at least in part, that outer perimeter of the interior plenum volume 208.

As shown in FIG. 5 and as mentioned earlier, in some implementations, an inlet passage 230 and an outlet passage 232 may be provided that allow for the temperature control fluid to be routed to and from, respectively, the interior plenum volume 208. As shown in the example of FIG. 5, the inlet passage 230 and the outlet passage 232 are both defined by portions of the sidewalls of two adjacent second reagent reservoirs 212 (in this example, one of the second reagent reservoirs 212 is sandwiched between the inlet passage 230 and the outlet passage 232 and portions of the sidewall of this second reagent reservoir 212 thus partially define both the inlet passage 230 and the outlet passage 232, although in some other implementations, the inlet passage 230 and the outlet passage 232 may be arranged such that they are defined, at least in part, by the sidewalls of completely different second reagent reservoirs 212). If a second reagent reservoir 212 contains a reagent 216 that may have particular temperature sensitivities, then such a second reagent reservoir 212 may, in some implementations, be positioned directly adjacent to the inlet passage 230 such that the temperature control fluid passes by such a second reagent reservoir 212 prior to passing into the interior plenum volume 208 and reaching the first reagent reservoirs 210. Through such an arrangement, i.e., by exposing the portion of the sidewall 214 of such a second reagent reservoir 212 to the temperature control fluid introduced to the cartridge 204 first, the temperature control fluid will have the highest (if used for heating) or lowest (if used for cooling) temperature when it flows by such a second reagent reservoir 212 as compared with the temperature such a temperature control fluid will have as it continues to flow through the cartridge 204 and either cools down or heats up as it exchanges heat with the remaining reagent reservoirs that it flows past or around. This may allow for more accurate heating or cooling of such a second reagent reservoir 212, as larger temperature differentials, and thus heat flow, between such a second reagent reservoir 212 and the temperature control fluid may be possible without subjecting the first reagent reservoirs to the same degree of heat flow. This may allow such second reagent reservoirs 212 to house reagents that are to be kept at higher or lower temperatures as compared with those in the first reagent reservoirs 210 and/or for such second reagent reservoirs 212 to contain larger volumes of reagent than the first reagent reservoirs 210.

It will be understood that in some implementations, there may not be any inlet passage and/or any outlet passage. For example, the gas inlet 220 and/or the gas outlet 222 may simply terminate at locations within the interior plenum volume, thus providing a direct fluidic connection between such gas inlets 220 and/or gas outlets 222 with the interior plenum volume. In some such implementations (as well as in implementations having an inlet passage and/or outlet passage, for that matter), the gas inlet 220 and/or the gas outlet 222 may, if desired, be positioned at locations that are located outside of a smallest enclosing perimeter of the first reagent reservoirs 210. The smallest enclosing perimeter of one or more items (such as two or more first reagent reservoirs 210), as the phrase is used herein, refers to a polygon or other shape that circumscribes the items and that has the smallest total edge length (the perimeter); all of the items in the one or more items would lie entirely within the smallest enclosing perimeter, although the outermost items may have edges that are coincident with, i.e., touch, the smallest enclosing perimeter and some of the items may be entirely within the smallest enclosing perimeter and may also not touch the smallest enclosing perimeter at all.

Figure 6A:
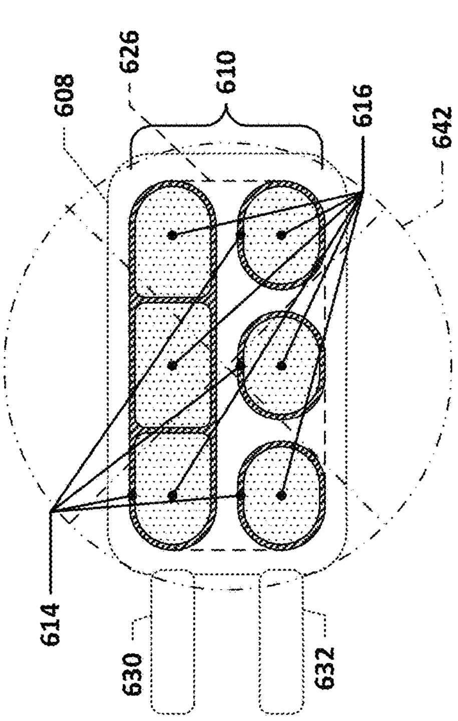
FIGS. 6A through 6D depict various additional arrangements of reagent reservoirs of a temperature-controllable cartridge.

FIGS. 6A through 6D depict various additional example arrangements of reagent reservoirs of a temperature-controllable cartridge. In FIG. 6A, six first reagent reservoirs 610 are shown, each defined by one or more sidewalls 614 and each containing a reagent 616. In this example, there are three first reagent reservoirs 610 (the upper ones in FIG. 6A) that share some sidewalls 614 in common, as well as three first reagent reservoirs 610 (the lower ones in FIG. 6A) that are free-standing, similar to those in FIGS. 4 and 5. In other implementations, the bottom three first reagent reservoirs 610 may be constructed in a manner similar to the top first reagent reservoirs 610 or vice versa. Generally speaking, it is desirable to have at least one fluid flow passage between the various first reagent reservoirs 610 (or, in some implementations, between the various first reagent reservoirs 610 and other structures, e.g., the structures defining the interior plenum volume 608), although multiple fluid flow passages between multiple first reagent reservoirs 610, such as may be seen in FIG. 6B, may allow for increased exposure of the first reagent reservoirs 610 to the temperature control fluid and thus better heating and/or cooling effect.

The first reagent reservoirs 610 may be located within an interior plenum volume 608, which may, in turn, be fluidically connected with an inlet passage 630 and an outlet passage 632, which may, in turn, be fluidically connected with a gas inlet and a gas outlet (not shown, but similar to those discussed above with respect to FIG. 3, for example), respectively. When temperature control gas is introduced into the interior plenum volume 608 from the inlet passage 630, the temperature control gas may flow through the fluid flow passages between the various first reagent reservoirs 610 as well as additional fluid flow passages defined between the first reagent reservoirs 610 and, for example, other structures, such as the structures that define the boundaries of the interior plenum volume 608. In this example, much of the temperature control gas may be withdrawn from the interior plenum volume 608 by the outlet passage 632 before having a chance to reach the right-most first reagent reservoirs 610, thereby reducing the temperature control effect on such first reagent reservoirs 610 as opposed to the left-most first reagent reservoirs 610, which are closest to the inlet passage 630 and the outlet passage 632 and thus will receive the most exposure to the temperature control fluid. In this example, the inlet passage 630 and the outlet passage 632 are both at least partially located within a common quadrant of a reference circle 642, similar to the inlet passage 230 and the outlet passage 232 of FIG. 5.

The example of FIG. 6A also includes a depiction of a representative smallest enclosing perimeter 626, which is generally the perimeter of the smallest polygon or other shape that can fully enclose two or more of the first reagent reservoirs; in this example, the smallest enclosing perimeter 626 encloses all of the first reagent reservoirs 610 in the interior plenum volume 608, and the gas inlet and the gas outlet (which would be positioned in the vicinity of the inlet passage 630 and the outlet passage 632) are located outside of the smallest enclosing perimeter 626 (when viewed in a direction generally perpendicular to the fluid flow directions through the fluid flow passages between the first reagent reservoirs 610, e.g., perpendicular to a base surface of the cartridge).

Figure 6B:
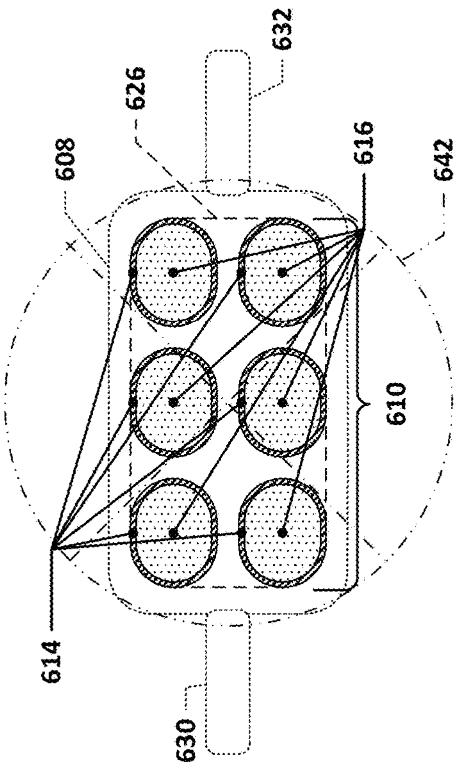

FIG. 6B depicts an example arrangement similar to that of FIG. 6A, except that the outlet passage 632 has been located on a side of the first reagent reservoirs 610 opposite from that where the inlet passage 630 is located, e.g., the inlet passage 630 and the outlet passage 632 are each at least partially located within two different quadrants of a reference circle 642 that are 180° out of phase with each other, thereby causing the temperature control fluid to generally flow past all of the first reagent reservoirs 610 (in contrast to the arrangement of FIG. 6A, where some of the temperature control fluid may never flow past the two rightmost first reagent reservoirs 610). In the arrangement shown in FIG. 6B, the leftmost first reagent reservoirs 610 will experience more heating or cooling (depending on the temperature of the temperature control fluid relative to the temperatures of the first reagent reservoirs 610) than the rightmost first reagent reservoirs 610, although this temperature gradient may be less pronounced than with the arrangement of FIG. 6A.

Figure 6C:
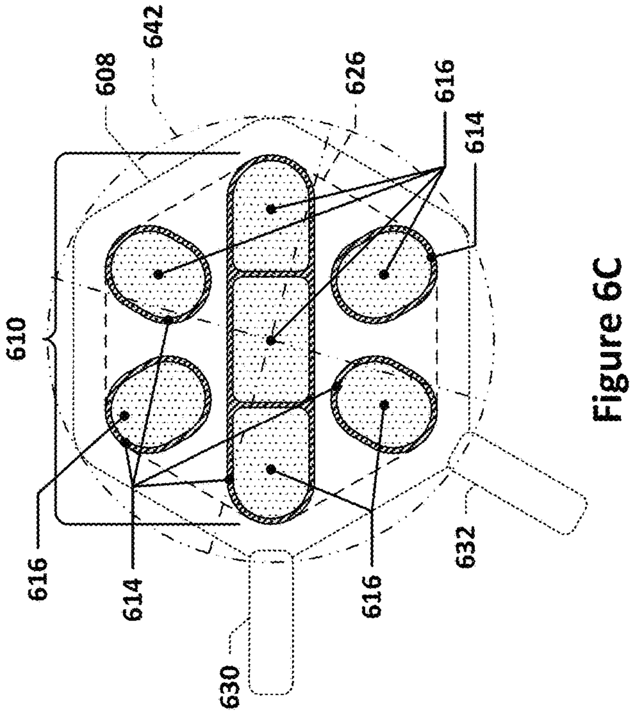

FIG. 6C depicts another example arrangement similar to that of FIG. 6A, except that there are seven first reagent reservoirs 610 that are arranged in a generally hexagonal arrangement instead of a rectangular arrangement. In this example, the inlet passage 630 and the outlet passage 632 are both generally located on the same side of the first reagent reservoirs 610, e.g., the inlet passage 630 and the outlet passage 632 are both at least partially located within a common quadrant of a reference circle 642, which may result in preferential cooling or heating of the leftmost first reagent reservoirs 610 than the rightmost first reagent reservoirs 610. Again, the gas inlet and the gas outlet (not shown) may be located outside of the smallest enclosing perimeter 626 of the first reagent reservoirs 610 in FIG. 6C.

Figure 6D:
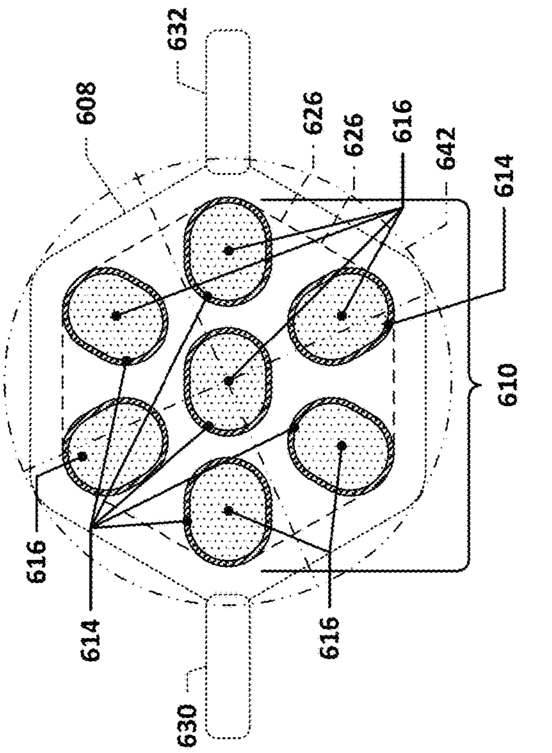

FIG. 6D depicts another example arrangement similar to that of FIG. 6C, except that the outlet passage 632 has been located on a side of the first reagent reservoirs 610 opposite from that where the inlet passage 630 is located, e.g., the inlet passage 630 and the outlet passage 632 are each at least partially located within two different quadrants of a reference circle 642 that are 180° out of phase with each other, thereby causing the temperature control fluid to generally flow past all of the first reagent reservoirs 610 (in contrast to the arrangement of FIG. 6C, where some of the temperature control fluid may never flow past the rightmost first reagent reservoirs 610). In the arrangement shown in FIG. 6D, the leftmost first reagent reservoirs 610 will experience more heating or cooling (depending on the temperature of the temperature control fluid relative to the temperatures of the first reagent reservoirs 610) than the rightmost first reagent reservoirs 610, although this temperature gradient may be less pronounced than with the arrangement of FIG. 6A.

It will be understood that while the discussions above have generally focused on implementations in which the gas inlet and the gas outlet are located outside of a smallest enclosing perimeter of all of the first reagent reservoirs for a cartridge, other implementations may feature gas inlets and gas outlets that are located outside of a smallest enclosing perimeter of only some of the first reagent reservoirs within a given cartridge but still in a location that results in variable heating and/or cooling of the first reagent reservoirs within the cartridge. For example, in some implementations, a gas inlet may be positioned within the smallest enclosing perimeter of all of the first reagent reservoirs within a given cartridge, but outside of the smallest enclosing perimeter of a subset of those first reagent reservoirs, e.g., with respect to FIG. 6C, at the 12 o'clock position, in between the two uppermost first reagent reservoirs 610 and within the smallest enclosing perimeter of the seven first reagent reservoirs 610 shown—such a location would still be outside of a different smallest enclosing perimeter defined by the five lower first reagent reservoirs 610.

While the focus of the above discussions has largely been on features of the cartridges discussed herein, e.g., structural arrangements of the reagent reservoirs and the gas inlet and gas outlet for a reagent cartridge, such cartridges rely on a connection to a source of temperature control fluid in order to provide for the temperature control of the reagents contained therein. The following discussion relates to various examples of types of temperature control systems that may be used to provide such temperature control fluid to the cartridges discussed herein.

Figure 7:
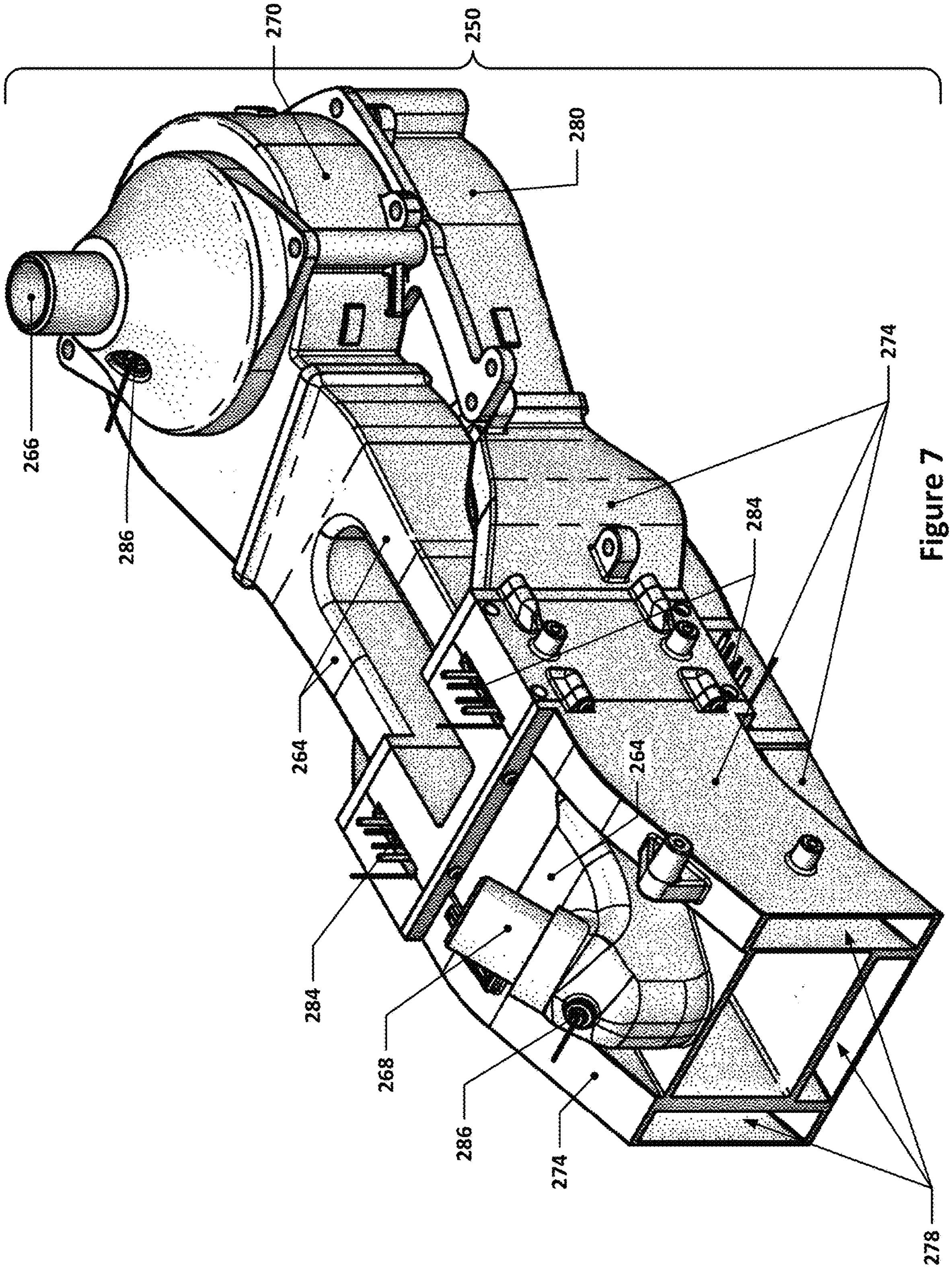
FIG. 7 depicts an example temperature control system for an analysis instrument.

FIG. 7 depicts an example temperature control system for an analysis instrument. In this example, the temperature control system 250 that is depicted is the same temperature control system of FIG. 2, although it will be understood that other types of temperature control system may be used with the cartridges discussed herein as well.

The temperature control system 250 may include two generally separate plenums—a recirculation plenum 264, which may be fluidically connected with the gas supply port 252 and the gas return port 254, as well as an ambient plenum 274, which may be fluidically connected with the ambient environment or with, for example, a volume of fluid that is much larger, e.g., multiple orders of magnitude larger, than the volume of the temperature control fluid that is used and that may serve as a heat sink or heat source for heat that is to be extracted from or supplied to the reagent reservoirs in a cartridge 204.

The recirculation plenum 264 may generally consist of one or more ducts that transport the temperature control fluid from a plenum inlet 266 of the recirculation plenum 264 to a plenum outlet 268 of the recirculation plenum 264. To facilitate the flow of the temperature control fluid through the recirculation plenum 264, the temperature control system 250 may also include a first fluid pump 270 which, in this example, is an impeller or blower fan that sucks gas in through the plenum inlet 266 of the recirculation plenum 264 and then propels or urges the gas through the ducting that forms the majority of the recirculation plenum. For example, the first fluid pump 270 may be fluidically interposed between the plenum inlet 266 of the recirculation plenum 264 and the plenum outlet 268 of the recirculation plenum. In other implementations, other forms of fluid pumps may be used instead, e.g., propeller-based pumps, positive displacement pumps, peristaltic pumps, etc., if desired.

There may also be a plenum inlet (not visible, but an opening, in this example, located on the opposite side of the temperature control system 250 from the plenum inlet 266 for the recirculation plenum 264) for the ambient plenum 274; the plenum inlet for the ambient plenum 274 may, for example, be an intake for a second fluid pump 280 which may, for example, be another impeller or blower fan. The second fluid pump 280 may be configured to cause ambient fluid, e.g., ambient air, to be pumped or urged from the plenum inlet of the ambient plenum 274, through the ambient plenum 274, and then out through plenum outlets 278 of the ambient plenum 274. Similar to the first fluid pump 270, the second fluid pump 280 may correspondingly be fluidically interposed between the plenum inlet 276 of the ambient plenum 274 and the plenum outlet 278 of the ambient plenum.

In some implementations, such as the one depicted, the recirculation plenum 264 and the ambient plenum 274 may be arranged such that they, for at least some portions thereof, share a common wall or otherwise have surfaces that are in close enough proximity that thermoelectric heat pumps 284, which are generally planar, may be inserted in between the recirculation plenum 264 and the ambient plenum 274 such that the major opposing surfaces of the thermoelectric heat pumps 284 are each facing into either the recirculation plenum 264 or the ambient plenum 274, thereby allowing the thermoelectric heat pumps 284 to pump heat from one plenum to the other. Temperatures within the temperature control system 250 may be monitored using a one or more sensors, e.g., temperature sensors 286, and the data therefrom used by a controller to facilitate proper operation of the thermoelectric heat pumps 284 to achieve a desired degree of heating or cooling of the temperature control fluid circulated through the recirculation plenum 264.

In the depicted example, the recirculation plenum 264 separates into three distinct ducts or duct regions downstream of the first fluid pump 270; these three ducts or duct regions have a cross-section in a plane generally perpendicular to the flow direction of the temperature control fluid and in the vicinity of the thermoelectric heat pumps 284 that may be described as U-shaped. The ambient plenum 274 in this example exhibits a similar, but larger, generally U-shaped cross-section in the same region and plane; this allows the ducts for the recirculation plenum 264 to be nested within the ducts for the ambient plenum 274 with the thermoelectric heat pumps 284 sandwiched in between the two sets of ducts. This is better illustrated in the FIG. 8.

Figure 8:
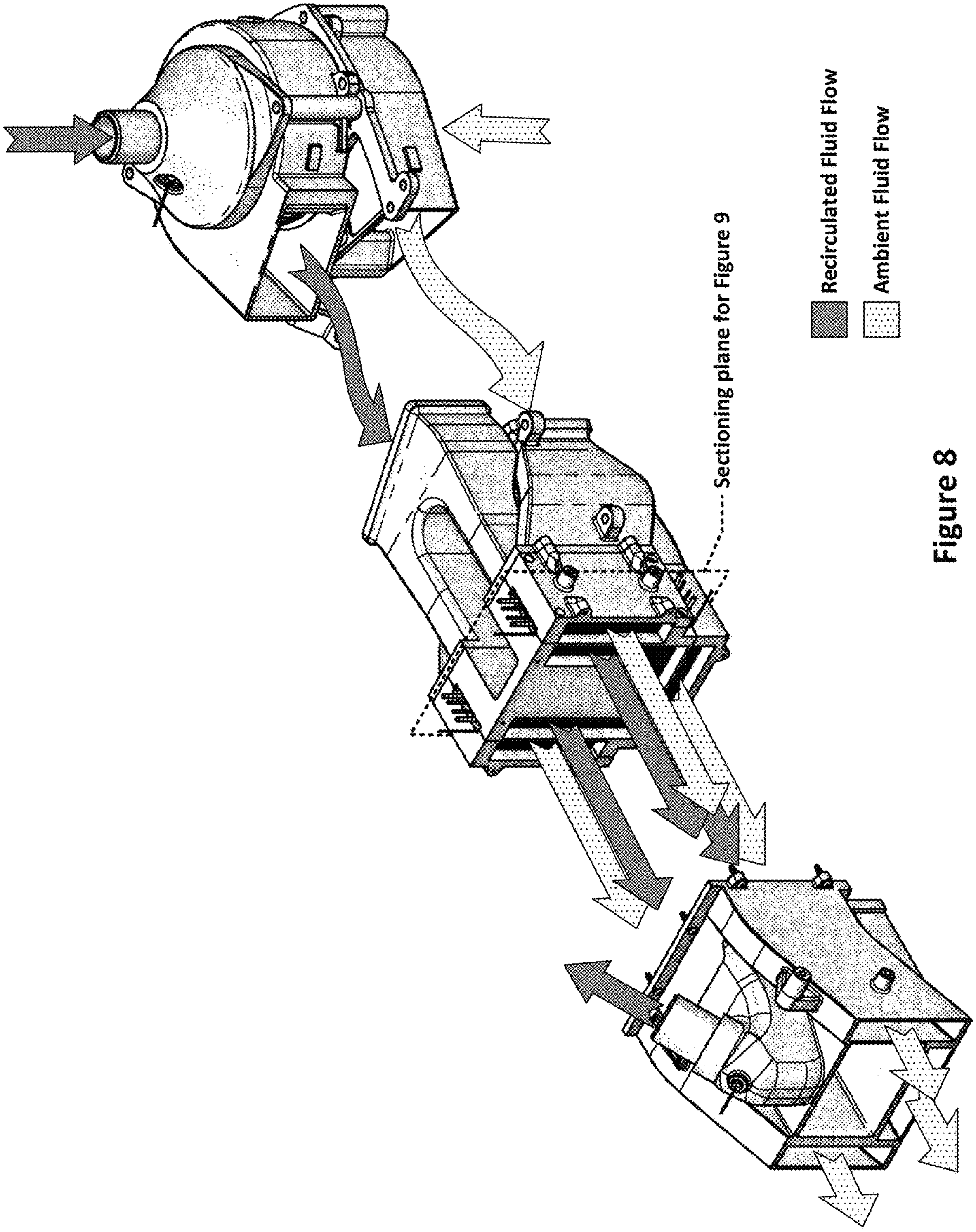
FIG. 8 depicts the example temperature control system of FIG. 7 in a partially exploded form.

FIG. 8 depicts the example temperature control system of FIG. 7 in a partially exploded form. As can be seen in FIG.

8, the temperature control system 250 has been separated into three major subassemblies. The rightmost subassembly includes the first fluid pump 270 and the second fluid pump 280, as well as the plenum inlets for the recirculation plenum 264 and the ambient plenum 274. The middle subassembly includes various ducts that are arranged to produce the cross-sections discussed in the previous paragraph, as well as the thermoelectric heat pumps 284 (visible through the exposed end of this subassembly on the left side). The leftmost subassembly includes the plenum outlets for the recirculation plenum 264 and the ambient plenum 274.

In FIG. 8, the flow of recirculated fluid, i.e., temperature control fluid, through the recirculation plenum when the temperature control unit is active is indicated through the use of dark-shaded arrows; flow of ambient fluid, e.g., air, through the ambient plenum 274 is shown with lighter-shaded arrows. As can be seen, the flow of both the temperature control fluid and the ambient fluid is split into three portions by the ducting arrangement used, with the temperature control fluid constrained to flow paths that are nested inside of the flow paths followed by the ambient fluid in the region occupied by the thermoelectric heat pumps 284. In temperature control systems that are used to circulate cooled temperature control fluids to cool down the reagents of a cartridge, such an arrangement may be beneficial since it reduces the amount of the exposed outer surface area of the recirculation plenum 264 and thus reduces the amount of exposed "cold" surface area, which may lead to a decrease in the amount of condensation from the ambient environment surrounding the temperature control system 250 that may collect on the exposed exterior surfaces thereof and need to be disposed of to prevent possible moisture damage to the analysis instrument. This may be particularly beneficial when an analysis unit featuring such an example temperature control system 250 is operated in environments with high ambient humidity. Such an arrangement also allows for a very compact temperature control system 250 as compared with systems in which the ducts are arranged in a more linear manner, e.g., single or plural ducts for the recirculation plenum and the ambient plenum that are laid out along a single line.

Figure 9:
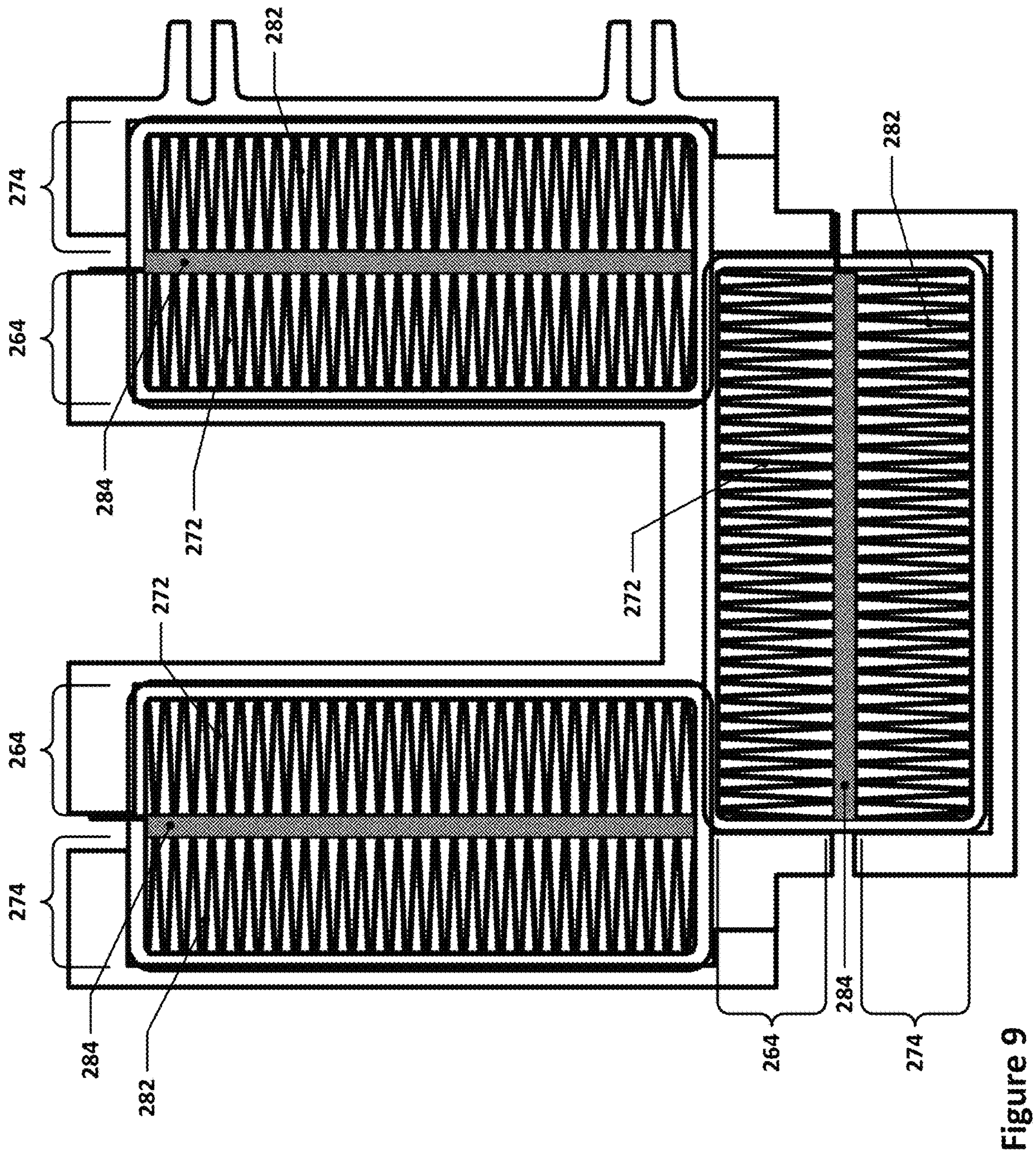
FIG. 9 depicts a cross-section of the example temperature control system of FIG. 7.

FIG. 9 depicts a cross-section of the example temperature control system of FIG. 7. In FIG. 9, the U-shaped arrangement of the ducts of the recirculation plenum 264 and the ambient plenum 274 are more clearly evident, as are the thermoelectric heat pumps 284 that are interposed between, and form common walls of, such ducts. As can be seen, each thermoelectric heat pump 284 is sandwiched between a recirculation plenum 264 duct and a corresponding ambient plenum 274 duct—by selectively controlling the thermoelectric heat pumps 284, heat may be caused to flow from the temperature control fluid in the recirculation plenum 264 to the ambient fluid that is flowed through the ambient plenum 274 in order to cool the temperature control fluid or vice versa if heating of the temperature control fluid is desired instead. To facilitate heat transfer between the temperature control fluid or the ambient fluid and the thermoelectric heat pumps 284, each thermoelectric heat pump 284 may be in thermally conductive contact with one or more radiator structures, e.g., structures with a large amount of exposed surface area relative to their to the surface area of the volume within which they fit (for example, the depicted radiator structures may have an exposed surface area that is greater than 10× the surface area of the volume of the duct within which they fit) and constructed of a material with a high thermal conductivity, such as copper, aluminum, or alloys thereof, to promote heat transfer between the temperature control fluid or the ambient fluid and the thermoelectric heat pumps 284. In FIG. 9, first radiator structures 272 may be located within the recirculation plenum 264 and in thermally conductive contact with the side of the thermoelectric heat pumps 284 facing into the recirculation plenum 264, and second radiator structures 282 may be within the ambient plenum 274 and in thermally conductive contact with the side of the thermoelectric heat pumps 284 facing into the ambient plenum 274. As can be seen, the radiator structures in this example consist of a thin sheet of accordion-folded, bellows-folded, recursively folded, or pleated material that contacts the thermoelectric heat pumps 284 along the sheet folds along one side of the radiator structure. In some implementations, an interface material, such as a thermally conductive grease or adhesive may be sandwiched in between the radiator structure and the thermoelectric heat pumps 284 to provide for enhanced heat transport across this interface. In other implementations, such radiator structures may have a thin outer skin that is bonded, e.g., through soldering, brazing, or thermally conductive adhesive, with such pleated structures; the outer skin may then be placed into thermally conductive contact with the thermoelectric heat pumps 284.

FIGS. 10A through 10D depict various additional plenum configurations for various example temperature control systems. It will be appreciated that other arrangements of the recirculation plenum 264 and the ambient plenum 274 may also provide desirable anti-condensation performance and/or a more compact packaging volume, for example, such as shown in Figures #JAA through 10D. FIGS. 10A through 10D are simplified cross-sectional diagrams showing various alternate arrangements of the recirculation plenum 264 and the ambient plenum 274 in the vicinity of, for example, the radiator structures.

Figures 10A, 10B, 10C, 10D:
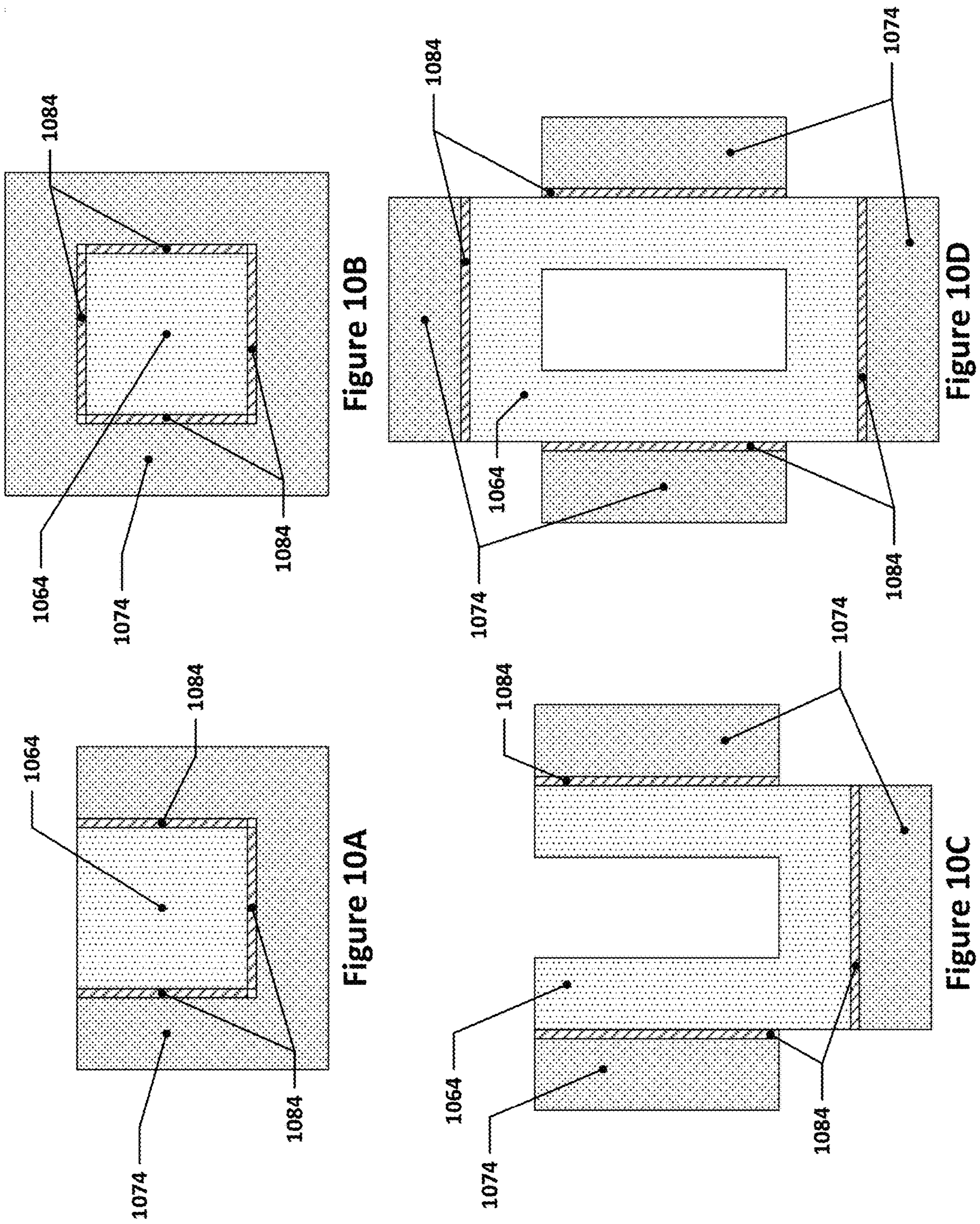
FIGS. 10A through 10D depict various additional plenum configurations for various example temperature control systems.

FIG. 10A, for example, depicts an arrangement in which an ambient plenum 1074 forms a continuous "U" shape and the recirculation plenum 1064 nested within it forms an "0" shape, i.e., does not have hollow or well in it as is the case with the example in FIG. 9. This may further reduce the externally exposed area of the recirculation plenum 1064 and thus further reduce the possibility of condensation forming on the exterior surfaces if the temperature control system is used for cooling. As can be seen, thermoelectric heat pumps 1084 may be placed in between the recirculation plenum 1064 and the ambient plenum 1074, similar to the arrangement in FIG. 9 (no radiator structures are shown in these Figures, but may be implemented as well, similar to how they are implemented in FIG. 9).

FIG. 10B depicts an arrangement similar to that of FIG. 10A, except that the ambient plenum 1074 is O-shaped and the generally extends completely around the recirculation plenum 1064, thus further reducing the potentially exposed exterior surfaces of the recirculation plenum 1064 and thus further reducing the possibility of condensation formation. The thermoelectric heat pumps 1084 in this example border all four sides of the recirculation plenum 1064, providing even more heat transfer capacity than the example shown in FIG. 10A.

FIG. 10C depicts an example implementation similar to that of FIG. 10A, but with the ambient plenum 1074 split into multiple ducts; this arrangement is quite similar to that depicted in FIG. 9. FIG. 10D depicts an example in which the recirculation plenum 1064 may have an annular aspect, e.g., have ducts that encircle a hollow space, and the ambient plenum 274 may be split into multiple ducts, each adjacent to a different side of the recirculation plenum 1064.

It will be understood that other implementations may feature different cross-sectional geometries of the recirculation plenum 1064 and the ambient plenum 1074, and the present disclosure is not to be limited to only the variants shown in the Figures.

Figure 11:
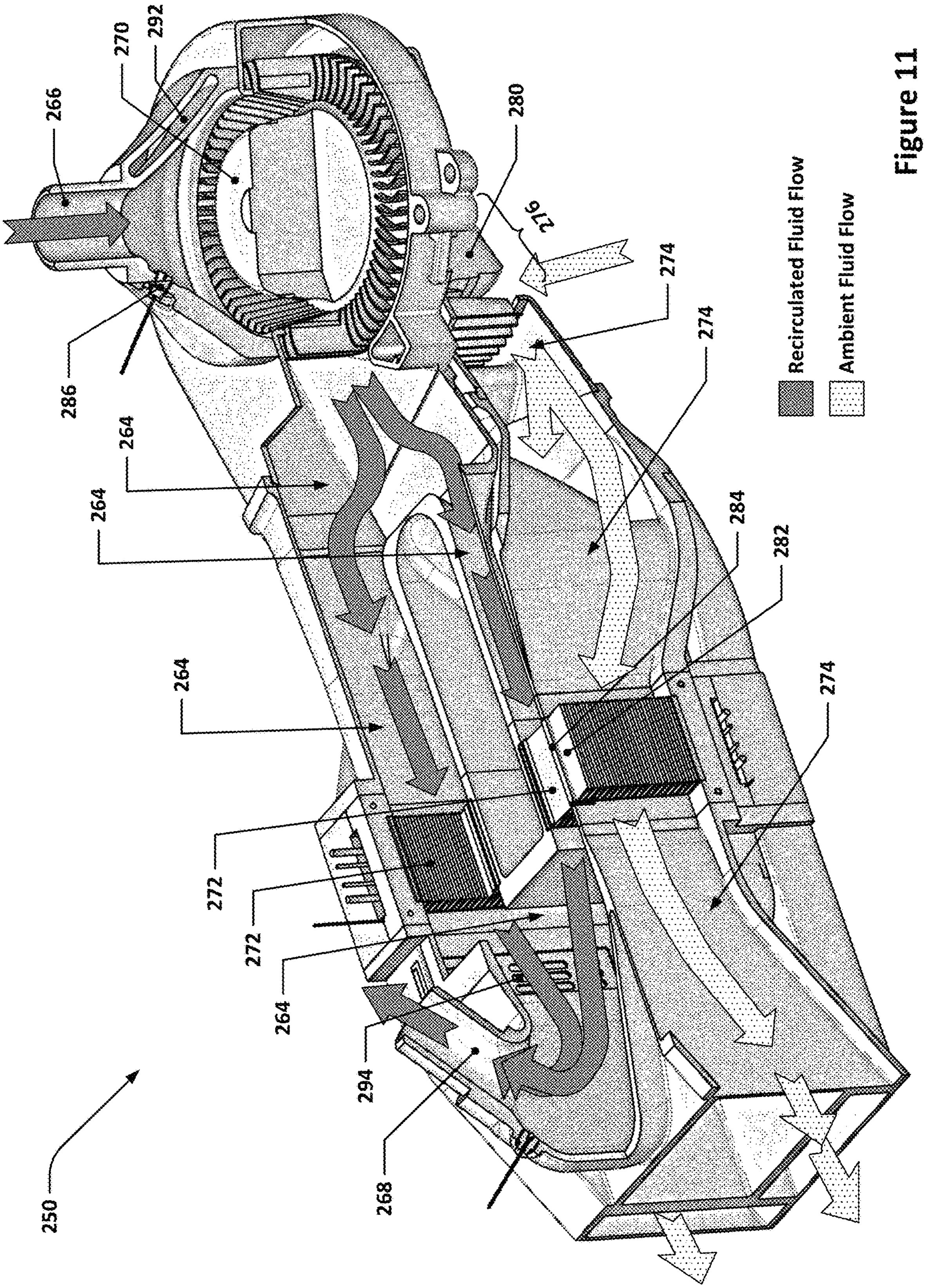
FIG. 11 depicts a cutaway view of the temperature control system of FIG. 7.

FIG. 11 depicts a cutaway view of the temperature control system of FIG. 7. FIG. 11 may provide additional clarity as to the fluid flows within the temperature control system 250, as well as some features not previously discussed. As can be seen, the recirculation plenum 264 and the ambient plenum 274 may, in some implementations, come together and share a common wall in regions adjacent to, or in the vicinity of, the thermoelectric heat pumps 284, while the thermoelectric heat pumps 284 may at the same time provide part of that shared common wall. In some implementations, the ducting that forms the recirculation plenum 264 and the ambient plenum 274 may be arranged such that there is only a small region, which includes the thermoelectric heat pump(s) 284, in which such plenums share a common wall; the remaining portions of the ambient plenum 274 and the recirculation plenum 264 may be defined by walls that are not shared between the two plenums. This reduces the possibility that heat will flow from the higher-temperature plenum to the lower temperature plenum, which will generally work to frustrate the operation of the thermoelectric heat pumps 284.

Also visible in FIG. 11 are the ambient plenum inlet 276, temperature sensors 286 at the recirculation plenum inlet 266 and the recirculation plenum outlet 268, and a double wall portion 292 of the generally conical expansion nozzle in between the recirculation plenum inlet 266 and the first fluid pump 270. When temperature control fluid is drawn out of the recirculation plenum inlet 266, the resulting expansion in volume may cause a sudden decrease in temperature; by using a double wall in this region (the double wall, for example, may, if used, extend around the entire circumference of this area or, optionally, only around a portion thereof), the chance of condensation occurring on the exterior of this nozzle area is reduced. Another feature that is visible in FIG. 11 is a humidity control port that includes a plurality of first drain holes 294. This feature is discussed in more detail in Figure s 12 and 13, which depict views of a portion of FIG. 7 featuring the humidity control port.

Temperature control systems and associated cartridges, such as those described herein, may be configured to generally recirculate the temperature control fluid. In implementations where exposure of the first reagent reservoirs in the cartridge to liquid temperature control fluid is undesirable, e.g., because the cartridge may not be easily made leak-tight or there is the possibility that the liquid temperature control fluid may contaminate the reagent reservoirs, e.g., through the vent holes that may be present, a gaseous temperature control fluid may be utilized instead of a liquid one. In such implementations, it may be desirable to not only prevent or reduce condensation on the exterior surfaces of the temperature control system 250, but it may also be desirable to prevent or reduce condensation within the recirculation plenum 264, as such condensation may then collect in the cartridge 204 during use and present contamination or other issues, such as leakage from the cartridge into the analysis instrument. In many implementations, it may not be feasible to completely seal the temperature control fluid flow paths through the cartridge, e.g., due to mechanical interfaces through the housing, construction techniques used (e.g., snap-together housings that are not gas-tight), and other considerations. As a result, some amount of the temperature control fluid, e.g., air, may leak out of the cartridge and/or temperature control system during use. Conversely, ambient air may leak into the cartridge and the temperature control system during use as well. Accordingly, it may be difficult to control the humidity of the temperature control fluid within the cartridge and the temperature control system—even if the temperature control fluid is initially provided as clean dry air, for example, over time, it will incorporate a larger amount of ambient air and whatever moisture such ambient air brings with it. A humidity control port such as that partially visible in FIG. 11 (the first drain holes 294 indicate the location of the humidity control port within the recirculation plenum 264).

Figure 13:
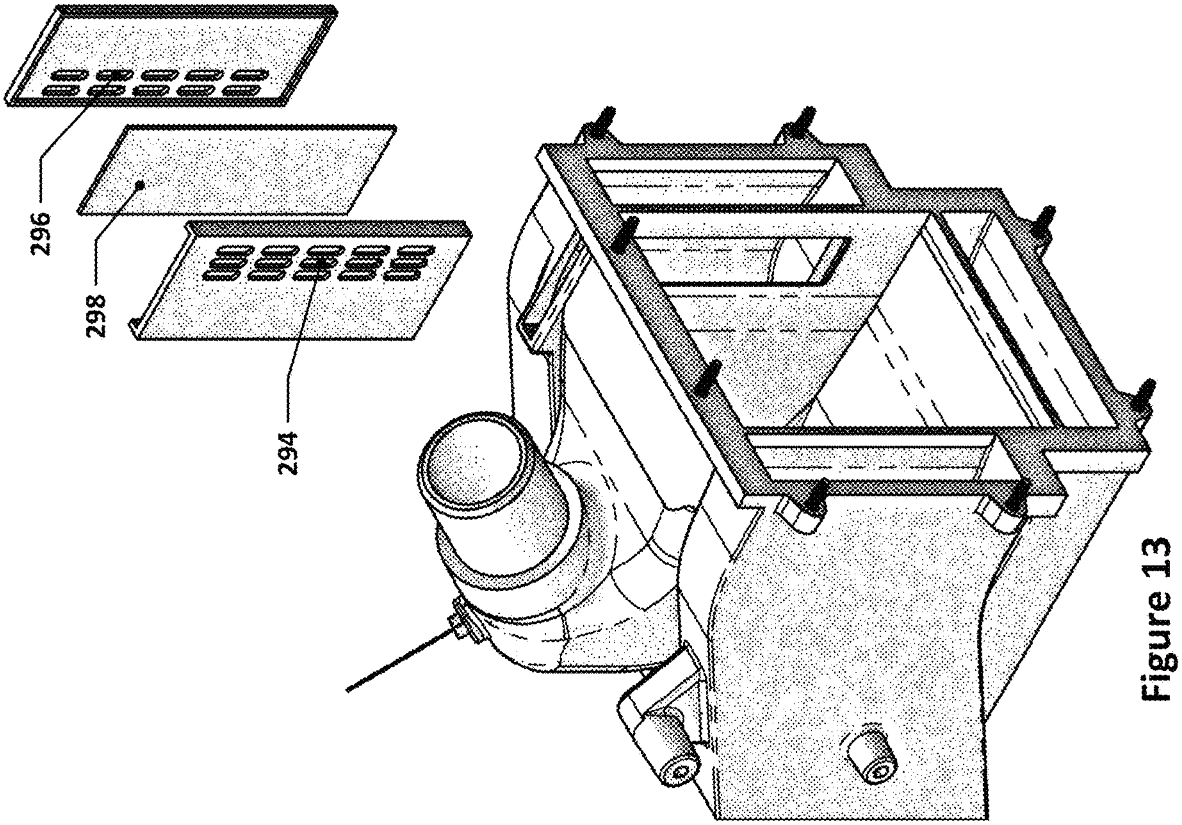
FIGS. 12 and 13 depict views of a portion of FIG. 7 featuring a humidity control port.
Figure 12:
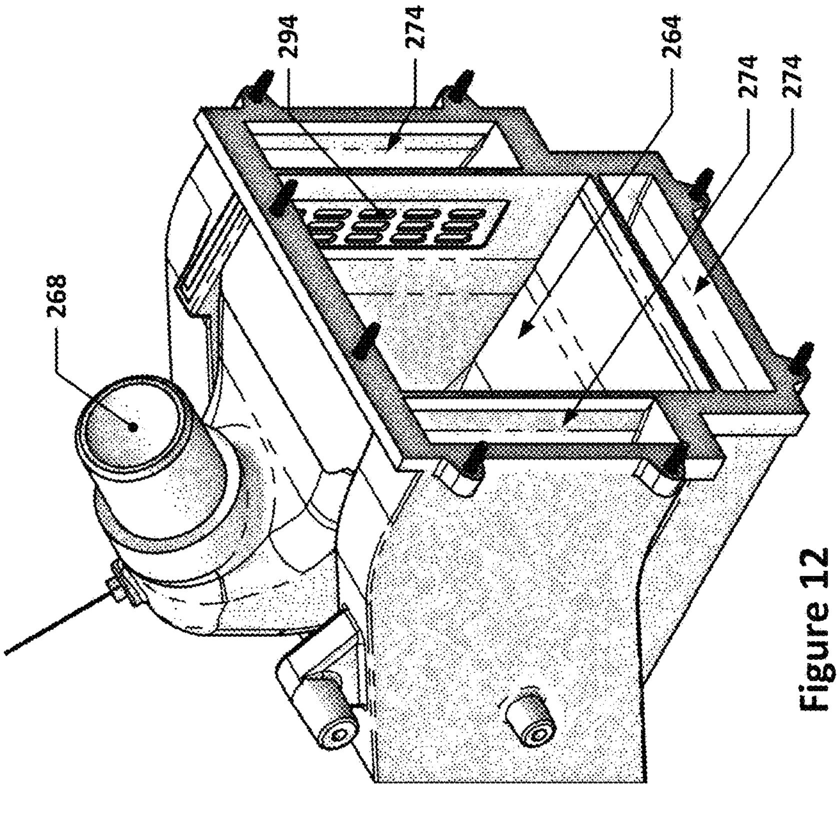

As can be seen in FIGS. 12 and 13, a humidity control port may be provided in one of the walls of the recirculation plenum 264; generally speaking, it is desirable to have the humidity control port be located on a “floor” surface, i.e., a surface on which gravity will cause moisture to collect. It may also be desirable to locate the humidity control port “downstream” of the thermoelectric heat pumps 284 such that the temperature control fluid that flows across the humidity control port is generally at a lower temperature than elsewhere in the temperature control system (thereby increasing the chance that any moisture in the temperature control fluid will condense onto the surfaces of the recirculation plenum 264 in the vicinity of the humidity control port) and the temperature of the ambient fluid flowing past the same area will be elevated, resulting in a fast evaporation of such moisture (it will be understood that this discussion is relevant to temperature control systems used for cooling of cartridges, although generally not relevant to those used for heating purposes).

The humidity control port may, for example, feature a construction where two panels, plates, or otherwise similar surfaces may each have a one or more drain holes passing therethrough. For example, the plate that defines part of the recirculation plenum 264 may have a plurality of first drain holes 294, and another plate that defines part of the ambient plenum 274 may have a plurality of second drain holes in it. The two plates may be arranged such that the first drain holes 294 and the second drain holes 296 do not overlap with one another when viewed along a direction perpendicular to the plates. Thus, any flow of gas or liquid through the two plates may first flow through the first drain holes 294, then laterally in the volume sandwiched between the two plates, and then out of the second drain holes 296. In a temperature control system used for cooling, the ambient air that then flows past the second drain holes 296 in the ambient plenum 274 may have an elevated temperature and thus encourage evaporation of any moisture that is present; the ambient air with the evaporated moisture may then be returned to the ambient environment after it flows out of the ambient plenum 274.

Such a humidity control port may also include a layer of wicking material 298 that is sandwiched in between the two plates, thereby spacing the two plates apart by the thickness of the wicking material 298 and providing a flow path from the first drain holes 294 to the second drain holes 296. The wicking material 298 may be, for example, a fibrous material such as polypropylene, e.g., sheets of thermally bonded polypropylene fibers, may be used. The thickness of the wicking material may be relatively small, e.g., on the order of a millimeter or so, so that the flow path provided thereby has a relatively high flow resistance so as to discourage flow of the temperature control fluid through the first drain holes 294 and the second drain holes 296. Generally speaking, liquid that collects on the humidity port will drain into the wicking material 298 through the first drain holes 294, wick to the second drain holes 296 through capillary action, and then be evaporated from the second drain holes 296 by the flow of warmer ambient air. Such an arrangement provides for efficient removal of excess moisture from the temperature control fluid.

FIGS. 14 through 19 depict another example temperature control system for an analysis instrument. In this example, the temperature control system 1450 that is depicted is different from the temperature control system of FIG. 2, although it will be understood that the temperature control system 1450 may provide similar functionality in many respects.

Figure 14:
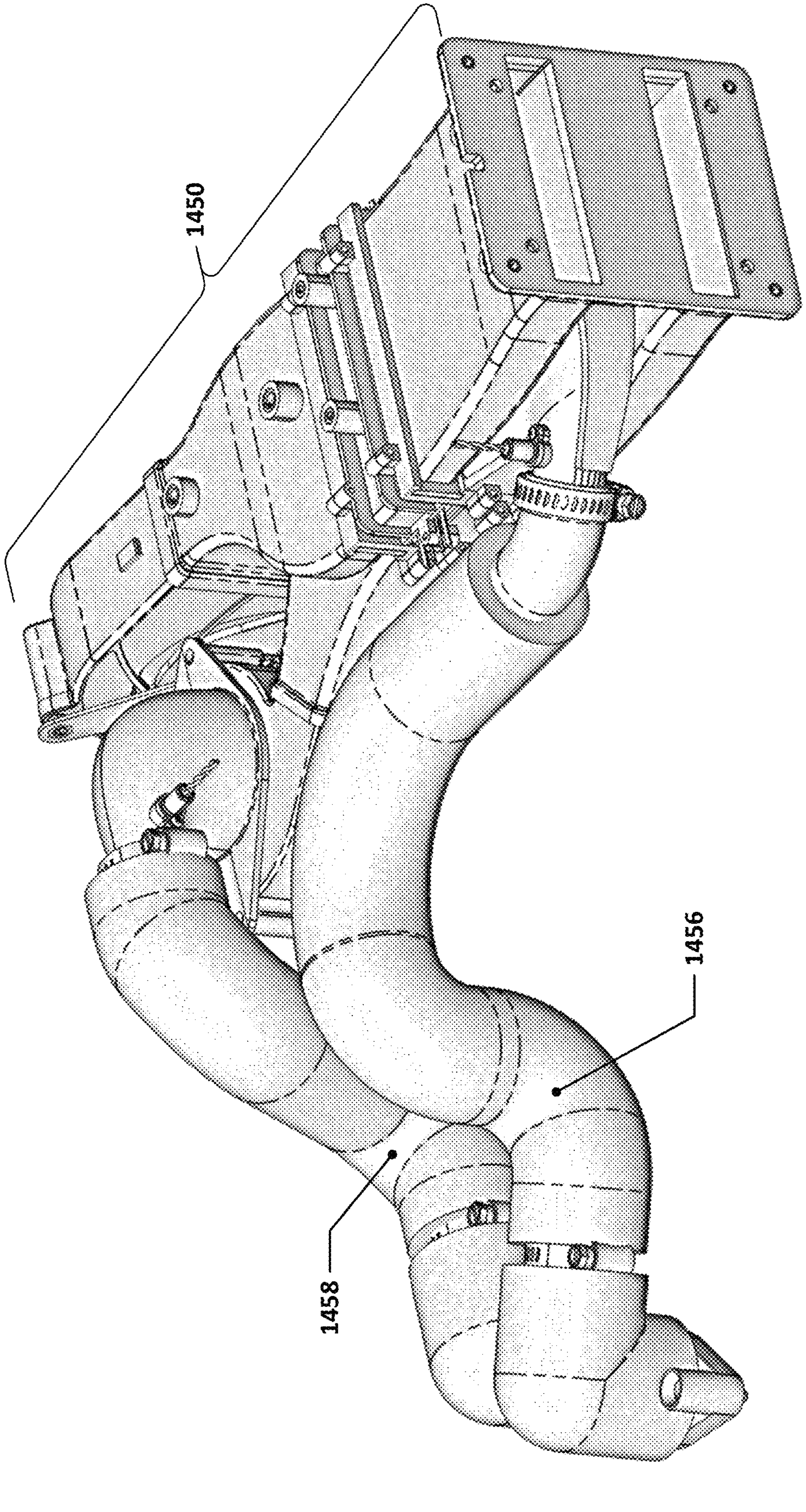
FIG. 14 depicts another example of a temperature control system.
Figure 15:
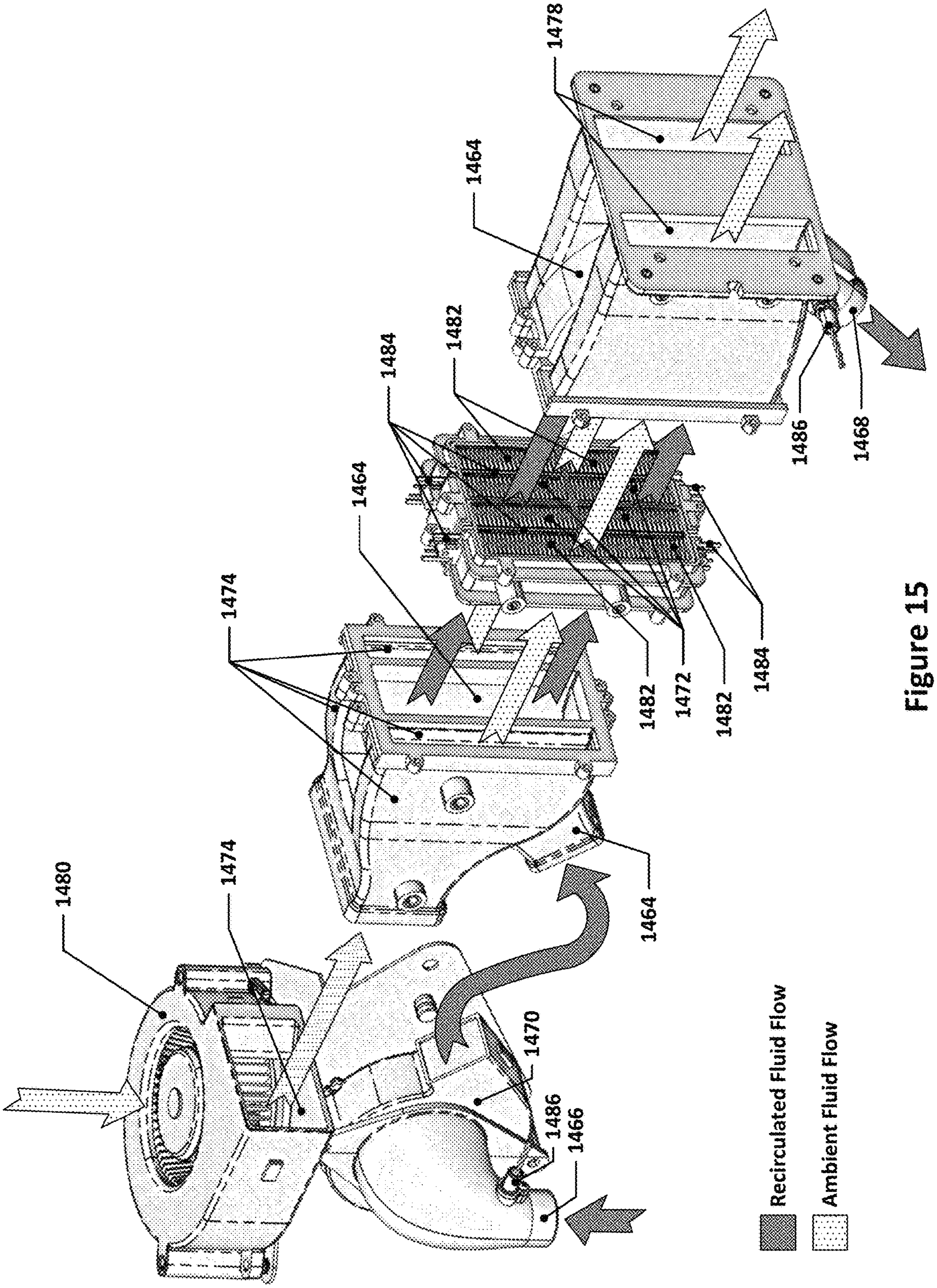
FIG. 15 depicts a partially exploded view of the example temperature control system of FIG. 14.

FIG. 14 shows the temperature control system 1450 with gas supply duct 1456 and gas return duct 1458, which may be fluidically connected with, for example, a cartridge of an analysis instrument in order to circulate cooled air through the cartridge.

FIG. 11 depicts a partially exploded view of the temperature control system 1450. As can be seen in FIG. 11, the temperature control system 1450 has been separated into four major subassemblies. The leftmost subassembly includes a first fluid pump 1470 and a second fluid pump 1480, as well as plenum inlets for the recirculation plenum 1464 and an ambient plenum 1474, such as first plenum inlet 1466; the plenum inlet for the ambient plenum 1474 may simply be the open hole in the top of the second fluid pump 1480. The left-middle subassembly includes various ducts that are arranged to produce a cross-sectional stack of a portion of the recirculation plenum sandwiched between two portions of the ambient plenum; the right-middle subassembly includes thermoelectric heat pumps 1484, first radiator structure(s) 1472, and second radiator structures 1482. The rightmost subassembly includes the plenum outlets for the recirculation plenum 1464 and the ambient plenum 1474, e.g., recirculation plenum outlet 1468 and ambient plenum outlets 1478. As with the temperature control system 1450, various temperature sensors 1486 may be included in order to monitor various aspects of the performance of the temperature control system 1450.

Figure 16:
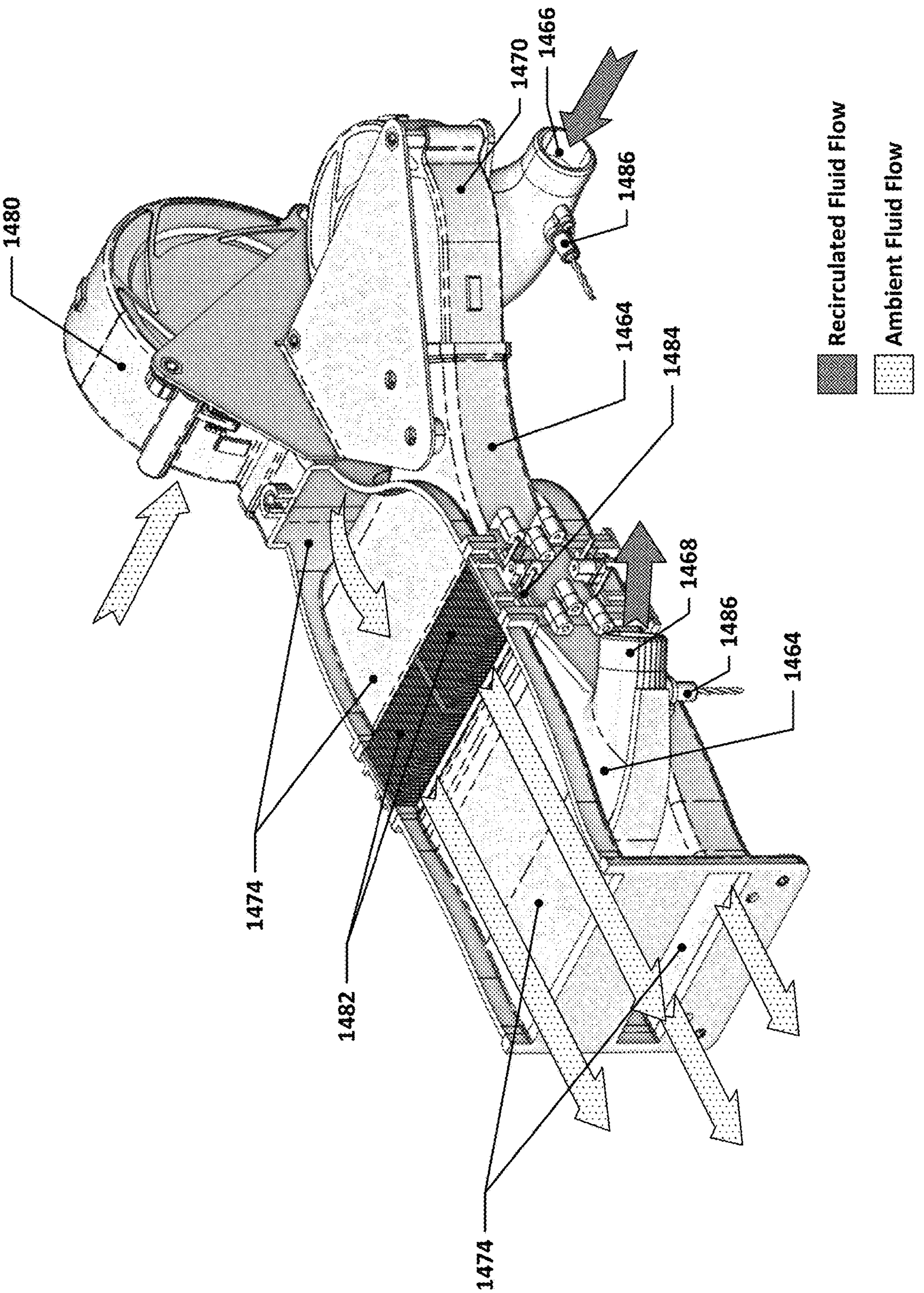
FIG. 16 depicts a cutaway view of the example temperature control system of FIG. 14.

FIG. 16 depicts an isometric partial cutaway view of the temperature control system 1450. In FIG. 16, the air from the second fluid pump 1480 may be directed into the ambient plenum 1474, where it may be split into, for example, two generally parallel fluid flows before being flowed through the second radiator structure(s) 1482, which may be in thermally conductive contact with the thermoelectric heat pumps 1484. The ambient air may then be flowed through the remainder of the ambient plenum 1474 before flowing out of the ambient plenum outlet 1478.

At the same time, recirculated air or other temperature control fluid may be flowed through the recirculation plenum 1464 by the first fluid pump 1470, e.g., drawn into the temperature control system 1450 through a recirculation plenum inlet 1466, through the recirculation plenum 1464, through the first radiator structures 1472 (not visible here), and out of the temperature control system 1450 by way of the recirculation plenum outlet 1468.

Figure 17:
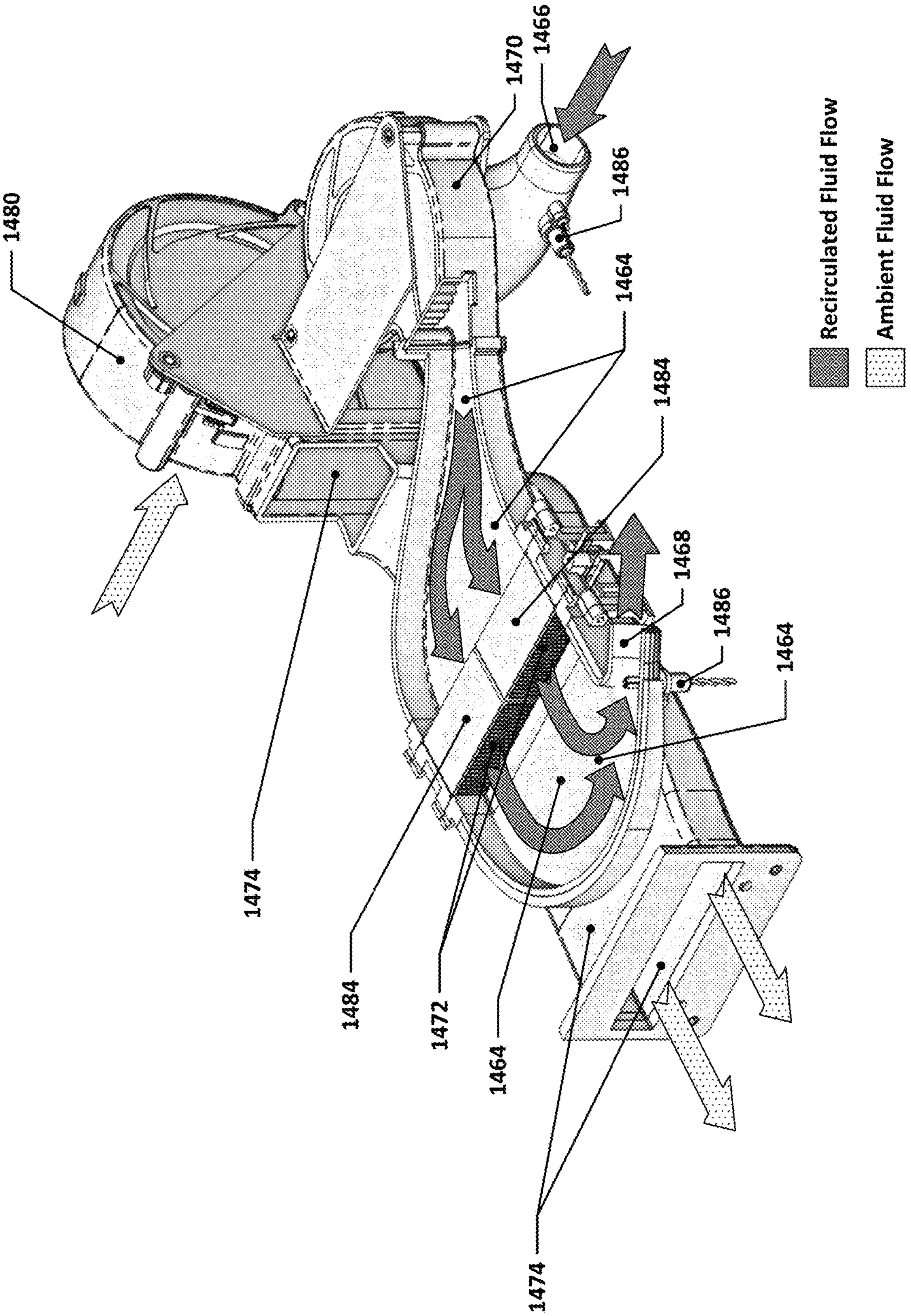
FIG. 17 depicts another cutaway view of the example temperature control system of FIG. 14.

As shown in FIG. 17, while the ambient air is being flowed through the ambient plenum 1474, air (or other gas or gas mixture) may be flowed through the recirculation plenum 1464 by the first fluid pump 1470. The recirculated temperature control fluid may thereby be caused to flow through the first radiator structures 1472, whereby the thermoelectric heat pumps 1484 may be caused to transfer heat from the recirculated temperature control fluid to the ambient gas via the second radiator structures 1482.

Figure 18:
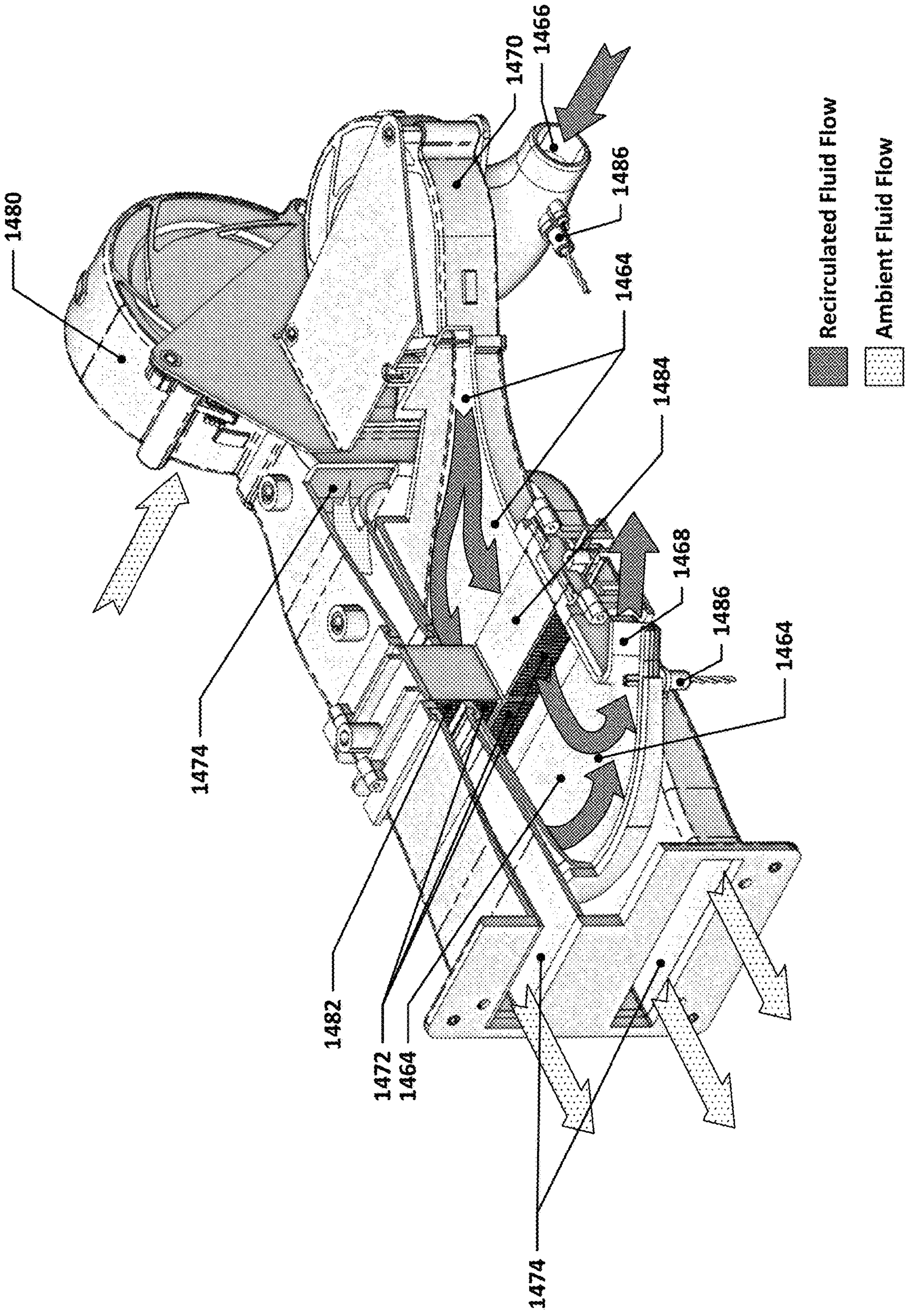
FIG. 18 depicts yet another cutaway view of the example temperature control system of FIG. 14.
Figure 19:
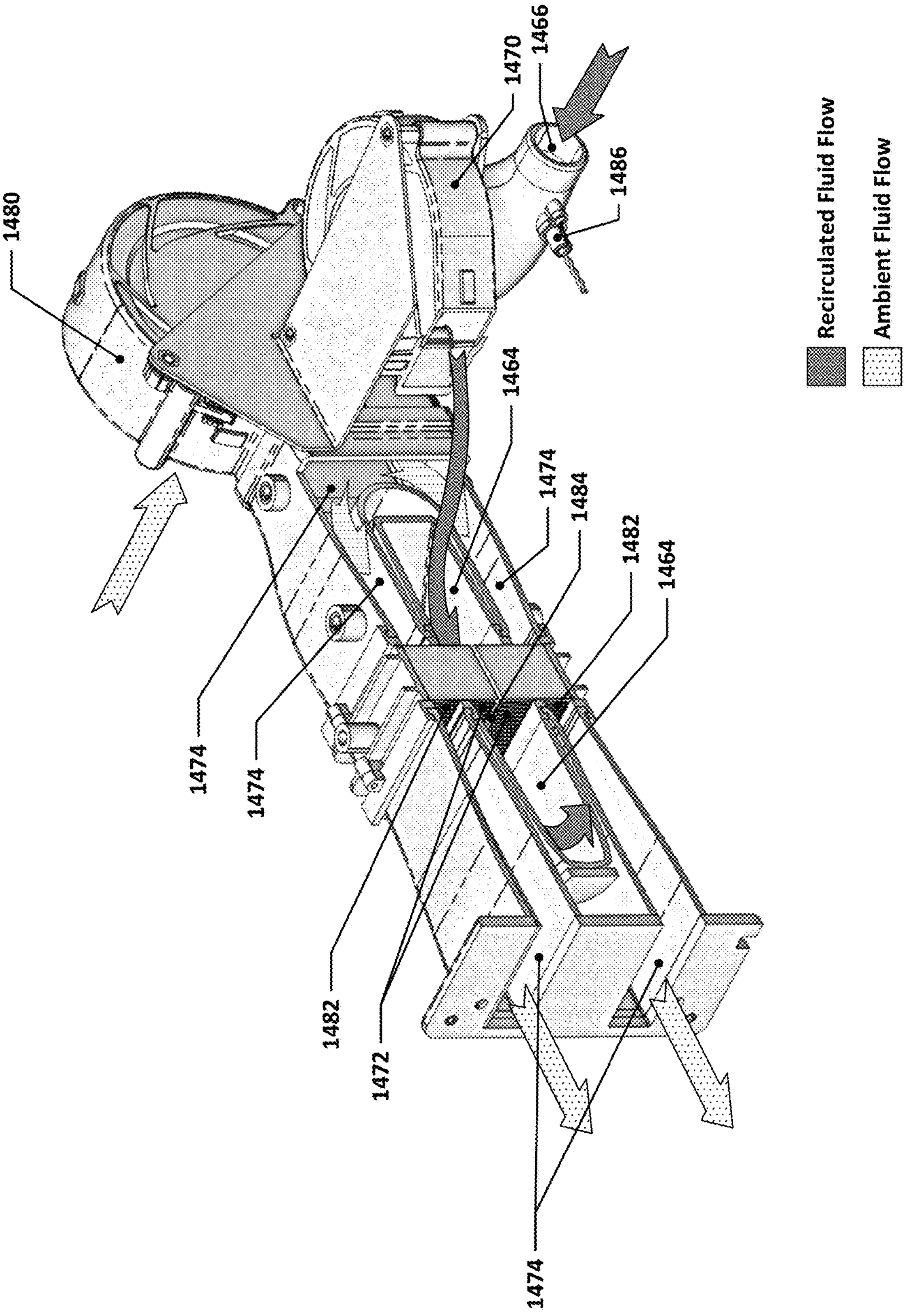
FIG. 19 depicts an additional cutaway view of the example temperature control system of FIG. 14.

FIGS. 18 and 19 show similar views of the temperature control system, but with different cutaway views that show both recirculation and ambient gas flows simultaneously.

The temperature control system of FIGS. 14 through 19 differs somewhat from the temperature control systems discussed earlier in that the plenum configuration that is provided by the temperature control system 1450 is a simple ambient-recirculation-ambient stack, e.g., a portion of the recirculation plenum is sandwiched between two portions of the ambient plenum. In the depicted implementation, the thermoelectric heat pumps 1484 are generally all co-planar, i.e., such that there is no thermoelectric heat pump that spans between other thermoelectric heat pumps that are arranged to be orthogonal to the "spanning" heat pump, e.g., such as are shown in FIGS. 10A and 10B. Such an arrangement allows for heat to be pumped out of opposing sides of the recirculation plenum simultaneously while allowing for a less complicated assembly.

It will be understood that, by way of example, if the temperature control systems of FIGS. 7 through 9 and 11 through 13 or of 14 through 19 are used in a cooling context, the thermoelectric heat pumps 284 or 1484 may be operated to pump heat from the temperature control fluid, e.g., air, that is in the recirculation plenums 264 or 1464 to cool the temperature control fluid down to, for example, a temperature of ~2° C. as it flows through the first radiator structures 272 or 1472. At the same time, the thermoelectric heat pumps 284 or 1484 may direct that heat into the second radiator structures 282 or 1482, thereby heating ambient air that is flowed through the ambient plenum 274 or 1484 to a much higher temperature, e.g., 40° C. to 50° C. Such performance allows such a temperature control system 250 to provide cooled air to the reagent cartridge 204 that may be used to keep various reagents within the reagent cartridge below, for example, 20° C.—even when operating in an ambient environment of up to 30° C. and 100% relative humidity for extended periods of time, e.g., 24 to 48 hours of continuous use. By way of example only, in one implementation similar to that shown in FIGS. 7 through 9 and 11 through 13, the thermoelectric heat pumps that were used included three thermoelectric heat pumps with heat-transfer areas of ~1200 sq mm each and with maximum heat pumping rates of ~22 W each, which were used to support a fluid flow rate of temperature control fluid of up to 0.2 cubic meters per minute with an ambient fluid flow rate of up to 2.3 cubic meters per minute.

It will also be understood that the concepts presented above may facilitate the use of reagent cartridges that are an "all-in-one" cartridge, i.e., that are the only consumable cartridge that is used in an analysis instrument. Such all-in-one reagent cartridges may not only include all of the reagents needed for such analyses, but may also, as shown, include valve hardware (such as the rotary valves 236) and also one or more microfluidic flow structures, e.g., a microfluidic plate that contains flow lanes or reaction areas. Using an all-in-one reagent cartridge with an in-cartridge cooling (or heating) system such as is disclosed herein may allow for much smaller volumes of reagents to be used, as the fluidic flow paths that must be traversed (and thus the working fluid volumes thereof) will be much smaller than in systems that use separate reagent cartridges. An implementation described herein can be a system comprising a reagent cartridge. The reagent cartridge includes a cartridge housing defining an interior plenum volume, the cartridge housing to be received by an analysis instrument, and a first set of reagent reservoirs positioned, at least in part, within the interior plenum volume of the cartridge housing, wherein:

each reagent reservoir of the first set of reagent reservoirs is defined, in part, by a sidewall and contains a corresponding reagent and a first reagent reservoir of the first set of reagent reservoirs is spaced apart from a second reagent reservoir of the first set of reagent reservoirs to form a fluid flow passage between corresponding sidewalls of the first reagent reservoir and the second reagent reservoir. The reagent cartridge may further include a fluid inlet that passes through the cartridge housing and is in fluidic communication with the interior plenum volume of the cartridge housing, the fluid inlet fluidically connecting a fluid supply port of a temperature control system of the analysis instrument with the interior plenum volume when the reagent cartridge is received by the analysis instrument. The reagent cartridge may also include a fluid outlet that passes through the cartridge housing and is in fluidic communication with the interior plenum volume of the cartridge housing, the fluid outlet fluidically connecting a fluid return port of the temperature control system of the analysis instrument with the interior plenum volume when the reagent cartridge is received by the analysis instrument, wherein the fluid inlet of the cartridge is to receive a fluid from the temperature control system of the analysis instrument at a predetermined temperature such that the reagent in the first reagent reservoir is at a first temperature and the reagent in the second reagent reservoir is at a second temperature that is different from the first temperature.

In some implementations of the systems described here, the first reagent reservoir contains one or more reagents selected from the group of: tris(hydroxypropyl)phosphine, ethanol amine, tris(hydroxymethyl)aminomethane, tris(hydroxymethyl)phosphine, and a mixture of tris(hydroxymethyl)aminomethane, acetic acid, and EDTA (ethylenediaminetetraacetic acid).

In some implementations of the systems described here, a shortest flow path within the cartridge housing from the fluid inlet to the first reagent reservoir of the first set of reagent reservoirs is shorter than a shortest flow path within the cartridge housing from the fluid inlet to the second reagent reservoir of the first set of reagent reservoirs.

In some implementations of the systems described herein, the fluid inlet is located outside of a smallest enclosing perimeter of the first set of reagent reservoirs.

In some implementations of the systems described herein, the first set of reagent reservoirs are arranged along one or more concentric circles and the fluid inlet is located outside of the one or more concentric circles.

In some implementations of the systems described herein, the first set of reagent reservoirs are arranged in a cluster about a rotary valve located in the cartridge housing, there are multiple fluid flow passages between the sidewalls of the reagent reservoirs in the first set of reagent reservoirs, and the multiple fluid flow passages provide one or more fluidic flow paths around the rotary valve.

In some implementations of the systems described herein, the reagent cartridge further includes an inlet passage that fluidically connects, and is fluidically interposed between, the fluid inlet and the interior plenum volume, as well as an outlet passage that fluidically connects, and is fluidically interposed between, the fluid outlet and the interior plenum volume, wherein the inlet passage, the outlet passage, and the first reagent reservoir are all located at least partially within a common quadrant of a reference circle centered on an average center point of the reagent reservoirs in the first set of reagent reservoirs.

In some implementations of the systems described herein, the systems further comprise an inlet passage that fluidically connects, and is fluidically interposed between, the fluid inlet and the interior plenum volume, as well as an outlet passage that fluidically connects, and is fluidically interposed between, the fluid outlet and the interior plenum volume, wherein the inlet passage is at least partially located within a first quadrant of a reference circle centered on an average center point of the reagent reservoirs in the first set of reagent reservoirs, the outlet passage is at least partially located in a second quadrant of the reference circle, and the first quadrant and the second quadrant are 180° out of phase with each other about the average center point.

In some implementations of the systems described herein, the systems further comprise a second set of reagent reservoirs, wherein each reagent reservoir of the second set of reagent reservoirs is defined, in part, by a corresponding sidewall, each reagent reservoir of the second set of reagent reservoirs contains a corresponding reagent, two of the reagent reservoirs in a first subset of the reagent reservoirs in the second set of reagent reservoirs are spaced apart from one another to form an inlet passage between the respective sidewalls thereof, and the inlet passage fluidically connects, and is fluidically interposed between, the fluid inlet and the interior plenum volume.

In some implementations of the systems described herein, two reagent reservoirs in a second subset of the reagent reservoirs in the second set of reagent reservoirs are spaced apart from one another to form an outlet passage between the respective sidewalls thereof, the outlet passage fluidically connects, and is fluidically interposed between, the fluid outlet and the interior plenum volume, and the first subset and the second subset are not identical.

In some implementations of the systems described herein, the reagent reservoirs in the second set of reagent reservoirs are arranged around an outer perimeter of the interior plenum volume and portions of the sidewalls of at least some of the reagent reservoirs in the second set of reagent reservoirs define, at least in part, the outer perimeter of the interior plenum volume.

In some implementations of the systems described herein, the systems further comprise the analysis instrument, wherein the analysis instrument includes the temperature control system and the temperature control system includes a recirculation plenum with a plenum inlet and a plenum outlet, a first fluid pump fluidically interposed between the plenum inlet of the recirculation plenum and the plenum outlet of the recirculation plenum and configured to urge fluid within the recirculation plenum from the plenum inlet of the recirculation plenum towards the plenum outlet of the recirculation plenum when activated, and one or more thermoelectric heat pumps, each thermoelectric heat pump in thermally conductive contact with a corresponding first radiator structure positioned within the recirculation plenum, wherein the plenum inlet of the recirculation plenum is fluidically connected with the fluid return port and the plenum outlet of the recirculation plenum is fluidically connected with the fluid supply port.

In some implementations of the systems described herein, the temperature control system further includes an ambient plenum with a plenum inlet and a plenum outlet and a second fluid pump fluidically interposed between the plenum inlet of the ambient plenum and the plenum outlet of the ambient plenum and configured to urge fluid within the ambient plenum from the plenum inlet of the ambient plenum towards the plenum outlet of the ambient plenum when activated, wherein each thermoelectric heat pump is also in thermally conductive contact with a corresponding second radiator structure positioned within the ambient plenum.

In some implementations of the systems described herein, a cross-section of the recirculation plenum for at least a portion of the recirculation plenum is nested within a corresponding cross-section of the ambient plenum for at least a corresponding portion of the ambient plenum.

Another implementation described herein can be an analysis instrument comprising a cartridge receptacle, the cartridge receptacle configured to receive a reagent cartridge containing a plurality of liquid reagents, and a temperature control system having a recirculation plenum with a plenum inlet and a plenum outlet, an ambient plenum with a plenum inlet and a plenum outlet, a first fluid pump fluidically interposed between the plenum inlet of the recirculation plenum and the plenum outlet of the recirculation plenum and configured to urge fluid within the recirculation plenum from the plenum inlet of the recirculation plenum towards the plenum outlet of the recirculation plenum when activated, a second fluid pump fluidically interposed between the plenum inlet of the ambient plenum and the plenum outlet of the ambient plenum and configured to urge fluid within the ambient plenum from the plenum inlet of the ambient plenum towards the plenum outlet of the ambient plenum when activated, one or more thermoelectric heat pumps, each thermoelectric heat pump in thermally conductive contact with a corresponding first radiator structure positioned within the recirculation plenum, a fluid supply port, and a fluid return port, wherein the plenum inlet of the recirculation plenum is fluidically connected with the fluid return port and the plenum outlet of the recirculation plenum is fluidically connected with the fluid supply port.

In some implementations of the analysis instruments described herein, a cross-section of the recirculation plenum for at least a portion of the recirculation plenum is nested within a corresponding cross-section of the ambient plenum for at least a corresponding portion of the ambient plenum.

In some implementations of the analysis instruments described herein, the analysis instruments further comprise the reagent cartridge, wherein the reagent cartridge includes a cartridge housing defining an interior plenum volume, the cartridge housing to be received by the cartridge receptacle of the analysis instrument, and a first set of reagent reservoirs positioned, at least in part, within the interior plenum volume of the cartridge housing, wherein each reagent reservoir of the first set of reagent reservoirs is defined, in part, by a sidewall and contains a corresponding reagent, and a first reagent reservoir of the first set of reagent reservoirs is spaced apart from a second reagent reservoir of the first set of reagent reservoirs to form a fluid flow passage between corresponding sidewalls of the first reagent reservoir and the second reagent reservoir. The reagent cartridge further includes a fluid inlet that passes through the cartridge housing and is in fluidic communication with the interior plenum volume of the cartridge housing, the fluid inlet fluidically connecting the fluid supply port with the interior plenum volume, and a fluid outlet that passes through the cartridge housing and is in fluidic communication with the interior plenum volume of the cartridge housing, the fluid outlet fluidically connecting the fluid return port with the interior plenum volume, wherein the fluid inlet of the cartridge is to receive a fluid from the temperature control system of the analysis instrument at a predetermined temperature such that the reagent in the first reagent reservoir is at a first temperature and the reagent in the second reagent reservoir is at a second temperature that is different from the first temperature.

Another implementation described herein can be a method comprising (a) providing a reagent cartridge having a cartridge housing defining an interior plenum volume, a fluid inlet that passes through the cartridge housing, a fluid outlet that passes through the cartridge housing, and a first set of reagent reservoirs positioned, at least in part, within the interior plenum volume of the cartridge housing, wherein each reagent reservoir of the first set of reagent reservoirs is defined, in part, by a sidewall and contains a corresponding reagent and a first reagent reservoir of the first set of reagent reservoirs is spaced apart from a second reagent reservoir of the first set of reagent reservoirs to form a fluid flow passage between corresponding sidewalls of the first reagent reservoir and the second reagent reservoir, (b) inserting the reagent cartridge into an analysis instrument, (c) connecting a fluid supply port of a temperature control system of the analysis instrument to the fluid inlet of the cartridge housing, (d) connecting a fluid return port of the temperature control system of the analysis instrument to the fluid outlet of the cartridge housing, and (e) activating the temperature control system to cause fluid at a first predetermined temperature to flow from the fluid supply port to the fluid inlet, from the fluid inlet to the interior plenum volume within the cartridge, from the interior plenum volume to the fluid outlet, and from the fluid outlet to the fluid return port to cause the reagent in the first reagent reservoir to be at a first temperature and the reagent in the second reagent reservoir to be at a second temperature that is different from the first temperature.

In some implementations of the method described herein, a shortest flow path within the cartridge housing from the fluid inlet to the first reagent reservoir of the first set of two or more reagent reservoirs is shorter than a shortest flow path within the cartridge housing from the fluid inlet to the second reagent reservoir of the first set of two or more reagent reservoirs and the performance of (e) causes the fluid to flow from the fluid inlet to both the first reagent reservoir and the second reagent reservoir along the respective shortest flow paths to the first reagent reservoir and the second reagent reservoir, respectively.

In some implementations of the method described herein, the first predetermined temperature is within about 0° C. to about 20° C. and the reagent contained in the first reagent reservoir comprises one or more selected from the group of: tris(hydroxypropyl)phosphine, ethanol amine, tris(hydroxymethyl)aminomethane, tris(hydroxymethyl)phosphine, and a mixture of tris(hydroxymethyl)aminomethane, acetic acid, and EDTA (ethylenediaminetetraacetic acid).

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

It is also to be understood that the use of "to," e.g., "the gas inlet of the cartridge is to receive a gas from the temperature control system," may be replaceable with language such as “configured to,” e.g., “the gas inlet of the cartridge is configured to receive a gas from the temperature control system”, or the like.

Terms such as “about,” “approximately,” “substantially,” “nominal,” or the like, when used in reference to quantities or similar quantifiable properties, are to be understood to be inclusive of values within ±10% of the values specified, unless otherwise indicated.

It is to be understood that the phrases “for each <item> of the one or more <items>,” “each <item> of the one or more <items>,” or the like, if used herein, should be understood to be inclusive of both a single-item group and multiple-item groups, i.e., the phrase “for . . . each” is used in the sense that it is used in programming languages to refer to each item of whatever population of items is referenced. For example, if the population of items referenced is a single item, then “each” would refer to only that single item (despite the fact that dictionary definitions of “each” frequently define the term to refer to “every one of two or more things”) and would not imply that there must be at least two of those items.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the concepts herein have been described with respect to the Figures, it will be appreciated that many modifications and changes may be made by those skilled in the art without departing from the spirit of the disclosure.

What is claimed is:

1. A system comprising:

a reagent cartridge, the reagent cartridge including:

a cartridge housing defining an interior plenum volume, the cartridge housing to be received by an analysis instrument;

a plurality of reagent reservoirs, the plurality of reagent reservoirs including a first set of reagent reservoirs positioned, at least in part, within the interior plenum volume of the cartridge housing, wherein:

at least two of the reagent reservoirs have sidewalls that are at least partially shared in common, each reagent reservoir of the first set of reagent reservoirs is defined, in part, by a sidewall and contains a corresponding reagent, the sidewalls of the first set of reagent reservoirs extend from a common microfluidic plate, and a first reagent reservoir of the first set of reagent reservoirs is spaced apart from a second reagent reservoir of the first set of reagent reservoirs to form a fluid flow passage between corresponding sidewalls of the first reagent reservoir and the second reagent reservoir;

a fluid inlet that passes through the cartridge housing and is in fluidic communication with the interior plenum volume of the cartridge housing, the fluid inlet fluidically connecting a fluid supply port of a temperature control system of the analysis instrument with the interior plenum volume when the reagent cartridge is received by the analysis instrument; and a fluid outlet that passes through the cartridge housing and is in fluidic communication with the interior plenum volume of the cartridge housing, the fluid outlet fluidically connecting a fluid return port of the temperature control system of the analysis instrument with the interior plenum volume when the reagent cartridge is received by the analysis instrument, wherein the fluid inlet of the cartridge is to receive a fluid from the temperature control system of the analysis instrument at a predetermined temperature such that the reagent in the first reagent reservoir is at a first temperature and the reagent in the second reagent reservoir is at a second temperature that is different from the first temperature.

2. The system of claim 1, wherein the first reagent reservoir contains one or more reagents selected from the group of: tris(hydroxypropyl)phosphine, ethanol amine, tris (hydroxymethyl)aminomethane, tris(hydroxymethyl)phosphine, and a mixture of tris(hydroxymethyl)aminomethane, acetic acid, and EDTA (ethylenediaminetetraacetic acid).

3. The system of claim 1, wherein a shortest flow path within the cartridge housing from the fluid inlet to the first reagent reservoir of the first set of reagent reservoirs is shorter than a shortest flow path within the cartridge housing from the fluid inlet to the second reagent reservoir of the first set of reagent reservoirs.

4. The system of claim 3, wherein the fluid inlet is located outside of a smallest enclosing perimeter of the first set of reagent reservoirs.

5. The system of claim 3, wherein the first set of reagent reservoirs are arranged along a circle or multiple concentric circles and the fluid inlet is located outside of the circle or the concentric circles.

6. The system of claim 1, wherein:

the first set of reagent reservoirs are arranged in a cluster about a rotary valve located in the cartridge housing, there are multiple fluid flow passages between the sidewalls of the reagent reservoirs in the first set of reagent reservoirs, and the multiple fluid flow passages provide one or more fluidic flow paths around the rotary valve.

7. The system of claim 1, where in the reagent cartridge further includes:

an inlet passage that fluidically connects, and is fluidically interposed between, the fluid inlet and the interior plenum volume; and an outlet passage that fluidically connects, and is fluidically interposed between, the fluid outlet and the interior plenum volume, wherein:

the inlet passage, the outlet passage, and the first reagent reservoir are all located at least partially within a common quadrant of a reference circle centered on an average center point of the reagent reservoirs in the first set of reagent reservoirs.

8. The system of claim 1, further comprising:

an inlet passage that fluidically connects, and is fluidically interposed between, the fluid inlet and the interior plenum volume; and an outlet passage that fluidically connects, and is fluidically interposed between, the fluid outlet and the interior plenum volume, wherein:

the inlet passage is at least partially located within a first quadrant of a reference circle centered on an average center point of the reagent reservoirs in the first set of reagent reservoirs, the outlet passage is at least partially located in a second quadrant of the reference circle, and the first quadrant and the second quadrant are 180° out of phase with each other about the average center point.

9. The system of claim 1, further comprising a second set of reagent reservoirs, wherein:

each reagent reservoir of the second set of reagent reservoirs is defined, in part, by a corresponding sidewall, each reagent reservoir of the second set of reagent reservoirs contains a corresponding reagent, two of the reagent reservoirs in a first subset of the reagent reservoirs in the second set of reagent reservoirs are spaced apart from one another to form an inlet passage between the respective sidewalls thereof, and the inlet passage fluidically connects, and is fluidically interposed between, the fluid inlet and the interior plenum volume.

10. The system of claim 9, wherein:

two reagent reservoirs in a second subset of the reagent reservoirs in the second set of reagent reservoirs are spaced apart from one another to form an outlet passage between the respective sidewalls thereof, the outlet passage fluidically connects, and is fluidically interposed between, the fluid outlet and the interior plenum volume, and the first subset and the second subset are not identical.

11. The system of claim 10, wherein:

the reagent reservoirs in the second set of reagent reservoirs are arranged around an outer perimeter of the interior plenum volume, and portions of the sidewalls of at least some of the reagent reservoirs in the second set of reagent reservoirs define, at least in part, the outer perimeter of the interior plenum volume.

12. The system of claim 1, further comprising the analysis instrument, wherein:

the analysis instrument includes the temperature control system, and the temperature control system includes:

a recirculation plenum with a plenum inlet and a plenum outlet, a first fluid pump fluidically interposed between the plenum inlet of the recirculation plenum and the plenum outlet of the recirculation plenum and configured to urge fluid within the recirculation plenum from the plenum inlet of the recirculation plenum towards the plenum outlet of the recirculation plenum when activated, and one or more thermoelectric heat pumps, each thermoelectric heat pump in thermally conductive contact with a corresponding first radiator structure positioned within the recirculation plenum such that at least part of the fluid that the first fluid pump is configured to urge through the recirculation plenum passes through the corresponding first radiator structure, wherein:

the plenum inlet of the recirculation plenum is fluidically connected with the fluid return port, and the plenum outlet of the recirculation plenum is fluidically connected with the fluid supply port.

13. The system of claim 12, wherein the temperature control system further includes:

an ambient plenum with a plenum inlet and a plenum outlet; and a second fluid pump fluidically interposed between the plenum inlet of the ambient plenum and the plenum outlet of the ambient plenum and configured to urge fluid within the ambient plenum from the plenum inlet of the ambient plenum towards the plenum outlet of the ambient plenum when activated, wherein each thermoelectric heat pump is also in thermally conductive contact with a corresponding second radiator structure positioned within the ambient plenum such that at least part of the fluid that the second fluid pump is configured to urge through the ambient plenum passes through the corresponding second radiator structure.

14. The system of claim 13, wherein a cross-section of the recirculation plenum for at least a portion of the recirculation plenum is nested within a corresponding cross-section of the ambient plenum for at least a corresponding portion of the ambient plenum.

15. The system of claim 1, further comprising a rotary valve configured to be selectively actuatable in order to cause different channels within the microfluidic plate to be in fluidic communication with different ones of the reagent reservoirs in the first set of reagent reservoirs.

16. An analysis instrument comprising:

a reagent cartridge comprising:

a cartridge housing defining an interior plenum volume, the cartridge housing to be received by a cartridge receptacle of the analysis instrument;

a plurality of reagent reservoirs, the plurality of reagent reservoirs including a first set of reagent reservoirs positioned, at least in part, within the interior plenum volume of the cartridge housing, wherein:

at least two of the reagent reservoirs have sidewalls that are at least partially shared in common, each reagent reservoir of the first set of reagent reservoirs is defined, in part, by a sidewall and contains a corresponding reagent, and a first reagent reservoir of the first set of reagent reservoirs is spaced apart from a second reagent reservoir of the first set of reagent reservoirs to form a fluid flow passage between corresponding sidewalls of the first reagent reservoir and the second reagent reservoir;

a fluid inlet that passes through the cartridge housing and is in fluidic communication with the interior plenum volume of the cartridge housing; and a fluid outlet that passes through the cartridge housing and is in fluidic communication with the interior plenum volume of the cartridge housing;

a cartridge receptacle; and a temperature control system having:

a recirculation plenum with a plenum inlet and a plenum outlet, an ambient plenum with a plenum inlet and a plenum outlet, a first fluid pump fluidically interposed between the plenum inlet of the recirculation plenum and the plenum outlet of the recirculation plenum and configured to urge fluid within the recirculation plenum from the plenum inlet of the recirculation plenum towards the plenum outlet of the recirculation plenum when activated, a second fluid pump fluidically interposed between the plenum inlet of the ambient plenum and the plenum outlet of the ambient plenum and configured to urge fluid within the ambient plenum from the plenum inlet of the ambient plenum towards the plenum outlet of the ambient plenum when activated, one or more thermoelectric heat pumps, each thermoelectric heat pump in thermally conductive contact with a corresponding first radiator structure positioned within the recirculation plenum such that at least part of the fluid that the first fluid pump is configured to urge through the recirculation plenum passes through the corresponding first radiator structure and with a corresponding second radiator structure positioned within the ambient plenum such that at least part of the fluid that the second fluid pump is configured to urge through the ambient plenum passes through the corresponding second radiator structure, a fluid supply port fluidically connected with the interior plenum volume via the fluid inlet, and a fluid return port fluidically connected with the interior plenum volume via the fluid outlet, wherein:

the reagent cartridge is positioned within the cartridge receptacle, the plenum inlet of the recirculation plenum is fluidically connected with the fluid return port, and the plenum outlet of the recirculation plenum is fluidically connected with the fluid supply port.

17. The analysis instrument of claim 16, wherein a cross-section of the recirculation plenum for at least a portion of the recirculation plenum is nested within a corresponding cross-section of the ambient plenum for at least a corresponding portion of the ambient plenum.

18. The analysis instrument of claim 16, wherein the fluid inlet of the cartridge is to receive a fluid from the temperature control system of the analysis instrument at a predetermined temperature such that the reagent in the first reagent reservoir is at a first temperature and the reagent in the second reagent reservoir is at a second temperature that is different from the first temperature.

* * * * *